(12) United States Patent
Ciaccio et al.

(10) Patent No.: US 11,220,988 B2
(45) Date of Patent: Jan. 11, 2022

(54) SYSTEMS AND METHODS FOR SUPPLYING POWER IN A HYBRID VEHICLE USING CAPACITORS, A BATTERY AND ONE OR MORE DC/DC CONVERTERS

(71) Applicant: Gentherm Inc., Northville, MI (US)

(72) Inventors: Michael Peter Ciaccio, Chelsea, MI (US); Brian Moorhead, Willis, MI (US)

(73) Assignee: Gentherm Incorporated, Northville, MI (US)

( * ) Notice: Subject to any disclaimer, the term of this patent is extended or adjusted under 35 U.S.C. 154(b) by 0 days.

(21) Appl. No.: 17/104,106

(22) Filed: Nov. 25, 2020

(65) Prior Publication Data

US 2021/0079879 A1 Mar. 18, 2021

Related U.S. Application Data

(62) Division of application No. 15/434,765, filed on Feb. 16, 2017, now Pat. No. 10,876,510.
(Continued)

(51) Int. Cl.
*F02N 11/04* (2006.01)
*H01M 10/44* (2006.01)
(Continued)

(52) U.S. Cl.
CPC ............... *F02N 11/04* (2013.01); *B60K 6/28* (2013.01); *B60L 1/00* (2013.01); *B60L 3/0046* (2013.01);
(Continued)

(58) Field of Classification Search
CPC .. F02N 11/04; F02N 11/0866; F02N 11/0825; F02N 2011/0885;
(Continued)

(56) References Cited

U.S. PATENT DOCUMENTS 4,757,249 A 7/1988 Farber et al.
6,037,749 A 3/2000 Parsonage
(Continued)

FOREIGN PATENT DOCUMENTS

CN 102376992 A 3/2012
CN 103367686 A 10/2013
(Continued)

OTHER PUBLICATIONS

Japanese Office Action for Application No. 2018-545209, dated Mar. 8, 2021.
(Continued)

*Primary Examiner* — Daniel Cavallari

(57) ABSTRACT

A system for discharging or charging a capacitor of a hybrid vehicle according to the present disclosure includes a target state of charge (SOC) module and a capacitor charge/discharge module. The target SOC module determines a target state of charge of the capacitor based on a speed of the vehicle. The capacitor charge/discharge module determines whether a state of charge of a capacitor is greater than a target state of charge. The capacitor charge/discharge module dissipates power from the capacitor to at least one of a battery of the vehicle and an electrical load of the vehicle when the state of charge of the capacitor is greater than the target state of charge.

18 Claims, 14 Drawing Sheets

Related U.S. Application Data

(60) Provisional application No. 62/336,056, filed on May 13, 2016, provisional application No. 62/302,372, filed on Mar. 2, 2016, provisional application No. 62/302,386, filed on Mar. 2, 2016.

(51) Int. Cl.

| | | |
|---|---|---|
| *H01M 10/48* | (2006.01) | |
| *H02J 7/14* | (2006.01) | |
| *B60L 58/13* | (2019.01) | |
| *B60K 6/28* | (2007.10) | |
| *B60W 50/14* | (2020.01) | |
| *B60W 50/00* | (2006.01) | |
| *B60L 50/15* | (2019.01) | |
| *B60L 53/00* | (2019.01) | |
| *H02J 7/34* | (2006.01) | |
| *B60L 50/40* | (2019.01) | |
| *B60W 20/13* | (2016.01) | |
| *H01M 12/00* | (2006.01) | |
| *H01G 11/04* | (2013.01) | |
| *B60L 1/00* | (2006.01) | |
| *B60L 3/00* | (2019.01) | |
| *B60L 7/16* | (2006.01) | |
| *F02N 11/08* | (2006.01) | |
| *B60W 20/00* | (2016.01) | |
| *B60R 16/033* | (2006.01) | |

(52) U.S. Cl.
CPC ............... *B60L 7/16* (2013.01); *B60L 50/15* (2019.02); *B60L 50/40* (2019.02); *B60L 53/00* (2019.02); *B60L 58/13* (2019.02); *B60W 20/13* (2016.01); *B60W 50/0097* (2013.01); *B60W 50/14* (2013.01); *F02N 11/0866* (2013.01); *H01G 11/04* (2013.01); *H01M 10/44* (2013.01); *H01M 10/48* (2013.01); *H01M 12/00* (2013.01); *H02J 7/1438* (2013.01); *H02J 7/345* (2013.01); *B60L 2210/12* (2013.01); *B60L 2210/14* (2013.01); *B60L 2240/54* (2013.01); *B60L 2250/22* (2013.01); *B60R 16/033* (2013.01); *B60W 20/00* (2013.01); *B60W 2510/244* (2013.01); *B60W 2520/10* (2013.01); *B60W 2710/244* (2013.01); *F02N 11/0825* (2013.01); *F02N 2011/0885* (2013.01); *F02N 2011/0888* (2013.01); *F02N 2011/0896* (2013.01); *F02N 2200/046* (2013.01); *F02N 2200/061* (2013.01); *F02N 2200/062* (2013.01); *F02N 2200/063* (2013.01); *F02N 2200/064* (2013.01); *H01M 2220/20* (2013.01); *Y02T 10/62* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y10S 903/907* (2013.01)

(58) Field of Classification Search
CPC ......... F02N 2200/062; F02N 2200/063; F02N 2200/046; F02N 2200/064; F02N 2200/061; F02N 2011/0896; F02N 2011/0888; H01G 11/04; B60K 6/28; B60L 50/40; B60L 1/00; B60L 3/0046; B60L 7/16; B60L 2210/12; B60L 2210/14; B60L 2240/54; B60L 2250/22; B60L 58/26; B60L 58/18; B60L 58/27; B60L 58/13; B60L 50/15; B60L 53/00; B60W 20/13; B60W 20/00; B60W 2510/244; B60W 2710/244; B60W 2520/10; B60W 50/14; B60W 50/0097; Y02T 10/62; Y02T 10/70; Y02T 10/72; Y02T 90/12; Y02T 10/7072; Y02T 90/14; B60R 16/033; H01M 2220/20; H01M 12/00; H01M 10/44; H01M 10/48; Y10S 903/907; Y02E 60/10; H02J 2310/46; H02J 2310/48; H02J 7/1438; H02J 7/345

See application file for complete search history.

(56) References Cited

U.S. PATENT DOCUMENTS

| | | | |
|---|---|---|---|
| 6,124,690 A | 9/2000 | Yano et al. | |
| 6,202,615 B1 | 3/2001 | Pels et al. | |
| 6,242,887 B1 | 6/2001 | Burke | |
| 6,371,067 B1 | 4/2002 | Schmitz et al. | |
| 6,484,832 B1 * | 11/2002 | Morisawa ............... | B60K 6/52 180/65.225 |
| 6,871,625 B1 | 3/2005 | Burke | |
| 7,319,306 B1 | 1/2008 | Rydman et al. | |
| 7,645,145 B2 | 1/2010 | Soma et al. | |
| 8,440,338 B2 | 5/2013 | Sato et al. | |
| 9,203,065 B2 | 12/2015 | Kim et al. | |
| 2002/0020381 A1 | 2/2002 | Pels | |
| 2005/0058892 A1 | 3/2005 | Ovshinsky et al. | |
| 2006/0060236 A1 | 3/2006 | Kim | |
| 2007/0033432 A1 | 2/2007 | Pecone et al. | |
| 2008/0265586 A1 | 10/2008 | Like et al. | |
| 2008/0276892 A1 | 11/2008 | Doljack | |
| 2009/0000310 A1 | 1/2009 | Bell et al. | |
| 2009/0056661 A1 | 3/2009 | Cook et al. | |
| 2009/0096285 A1 | 4/2009 | Acena et al. | |
| 2009/0141447 A1 | 6/2009 | Soma et al. | |
| 2009/0160249 A1 | 6/2009 | Soma et al. | |
| 2009/0315518 A1 | 12/2009 | Soma et al. | |
| 2011/0074362 A1 | 3/2011 | Midorikawa | |
| 2011/0139397 A1 | 6/2011 | Haussmann | |
| 2011/0189533 A1 | 8/2011 | Reis et al. | |
| 2012/0025755 A1 | 2/2012 | Xu et al. | |
| 2012/0156534 A1 | 6/2012 | Sujan et al. | |
| 2013/0127399 A1 | 5/2013 | Tang et al. | |
| 2013/0154543 A1 | 6/2013 | Richardson et al. | |
| 2013/0213336 A1 | 8/2013 | Solberg et al. | |
| 2013/0260611 A1 | 10/2013 | Ahn | |
| 2013/0264869 A1 | 10/2013 | Klinkig et al. | |
| 2013/0320764 A1 | 12/2013 | Zeller | |
| 2014/0018975 A1 | 1/2014 | Maslyn et al. | |
| 2014/0200763 A1 | 7/2014 | Sisk | |
| 2015/0298557 A1 | 10/2015 | Sakata et al. | |
| 2015/0300307 A1 | 10/2015 | Setterberg et al. | |
| 2016/0297317 A1 | 10/2016 | Huang et al. | |
| 2017/0253127 A1 | 9/2017 | Ciaccio et al. | |
| 2017/0253231 A1 | 9/2017 | Ciaccio et al. | |
| 2017/0256833 A1 | 9/2017 | Ciaccio et al. | |

FOREIGN PATENT DOCUMENTS

| | | |
|---|---|---|
| CN | 203325984 U | 12/2013 |
| DE | 4028242 A1 | 3/1992 |
| DE | 19628222 A1 | 1/1998 |
| DE | 29723175 U1 | 4/1998 |
| DE | 102004062939 A1 | 7/2006 |
| DE | 102005051433 A1 | 5/2007 |
| DE | 102007003005 A1 | 2/2008 |
| DE | 102009006665 A1 | 8/2010 |
| DE | 102014203030 A1 | 8/2015 |
| EP | 0945959 A2 | 9/1999 |
| EP | 2607178 A1 | 6/2013 |
| EP | 2567424 B1 | 8/2015 |
| FR | 2923551 A1 | 5/2009 |
| JP | H11176487 A | 7/1999 |
| JP | 2008066246 A | 3/2008 |
| JP | 2009176587 A | 8/2009 |
| JP | 201348063 A | 3/2013 |
| JP | 2013242979 A | 12/2013 |
| JP | 201617339 A | 2/2016 |
| KR | 101157413 B1 | 6/2012 |

(56) References Cited

FOREIGN PATENT DOCUMENTS

| WO | WO-9912044 A2 | 3/1999 |
| WO | WO-0014402 A1 | 3/2000 |
| WO | WO-2006121005 A1 | 11/2006 |
| WO | WO-2011097188 A1 | 8/2011 |
| WO | WO-2011-138156 A1 | 11/2011 |
| WO | WO-2013027982 A2 | 2/2013 |
| WO | WO-2013172397 A1 | 11/2013 |
| WO | WO-2014128753 A1 | 8/2014 |

OTHER PUBLICATIONS

U.S. Appl. No. 15/208,112, filed Jul. 2, 2016, Ciaccio et al.
U.S. Appl. No. 15/208,143, filed Jul. 12, 2016, Ciaccio et al.
U.S. Appl. No. 15/434,765, filed Feb. 16, 2017, Ciaccio et al.
International Search Report for Application No. PCT/US2017/020222 dated Jun. 14, 2017.
Kendall, John. 2017 SAE International Article: "PSA's new stop/start system uses ultracaps for energy storage, extra power"; website: <http://articles.sae.org/8412/>: Jun. 21, 2010; 2 Pages.
Warner, Brad. "Valeo i-StARS and ReStart Innovations Offer Affordable Hybrid Solutions for Internal Combustion Engines"; Feb. 27, 2012; website: <http://www.prnewswire.com/news-releases/valeo-i-stars-and-restart-innovations-offer-affordable-hybrid-solutions-for-internal-combustion-engines-140549873.html>: 2 Pages.
Werkstetter, Stefan, "White Paper: Ultracapacitor Usage in Wind Turbine Pitch Control Systems"; Maxwell Technologies, Inc. Jan. 2015; website: http://www.maxwell.com/images/documents/Wind_Turbine_Pitch_Control_White%20Paper_3000722_1.pdf; 10 Pages.
Miller, Gretchen. "Johnson Controls to unveil new battery system for Advanced Start-Stop vehicles at the North American International Auto Show." Johnson Controls; Jan. 8, 2015; website: <http://www.prnewswire.com/news-releases/johnson-controls-to-unveil-new-battery-system-for-advanced-start-stop-vehicles-at-the-north-american-international-auto-show-300017559.html>: 2 Pages.
"In-market Application of Start-Stop Systems in European Market." FEV Inc.; Final Report/Dec. 2011; P26844-01/ A1/ 01/ 61605; website: http://www.theicct.org/sites/default/files/FEV_LDV%20EU%20Technology%20Cost%20Analysi s_StartStop%20Overview.pdf; 108 Pages.
Radu, Mihnea. "Hybrid Renault Megane Confirmed for 2017 with dCi Diesel Engine". Sep. 26, 2015; website: https://www.autoevolution.com/news/hybrid-renault-megane-confirmed-for-2017-with-dci-diesel-engine-100384.html; 4 Pages.
"Brake Energy Regeneration System: i-ELOOP continuously recovers kinetic energy as the vehicle decelerates and reuses it as electricity". MAZDA: Environmental Technology website: http://www.mazda.com/en/innovation/technology/env/i-eloop/; 4 Pages.
"BU-205: Types of Lithium-ion". Battery University website: http://batteryuniversity.com/learn/article/types_of_lithium_ion; last updated Jun. 28, 2017; 22 Pages.
Ashley, Steven. 2013 SAE International Article: "Supercapacitors aim to charge ahead"; website: http://articles.sae.org/12554/; Oct. 25, 2013; 2 Pages.
"CAP-XX Introduces Prismatic Supercapacitors For Automotive Stop-Start Applications"; website: http://www.electric-vehiclenews.com/2012/03/cap-xx-introduces-prismatic.html; Mar. 14, 2012; 3 Pages.
"Mazda's i-ELOOP regenerative braking system". Mazda USA; YouTube video: https://www.youtube.com/watch?v=BJHAr4wA2fc; published on Oct. 30, 2012.
PCT—Invitation to Pay Additional Fees and, Where Applicable, Protest Fee dated Jun. 7, 2017 for PCT Application No. PCT/US2017/020236, including Annex to Form PCT/ISA/206: Communication Relating to the Results of the Partial International Search; 15 pages.
Burkert, Andreas. "Power for the Future with 48 V". MTZ Magazine, Jan. 2016, vol. 77; 5 Pages.
International Search Report and Written Opinion dated Aug. 14, 2017 corresponding to International Application No. PCT/US2017/020228, 27 pages.
International Search Report and Written Opinion dated Sep. 19, 2017 corresponding to International Application No. PCT/US2017/020236, 38 pages.
California Environmental Protection Agency Air Resources Board. "Draft Technology Assessment: Medium- and Heavy- Duty Battery Electric Trucks and Buses"; Oct. 2015; 4 pages.
IDTechEx. "A very different supercapacitor bus". Web site: http://www.electricvehiclesresearch.com/articles/6974/a-very-different-supercapacitor-bus; printed May 9, 2016; 2 pages.
Dr. A. Schneuwly, Dipl. Ing. J. Auer, Dr. J. Miller. Maxwell Technologies SA. White Paper: "Ultracapacitors Help to Overcome the Prospective Energy Requirements of Vehicles". Apr. 2009; 21 pages.
Kerns, J. (May 11, 2015). What's the Difference Between Batteries and Capacitors? Retrieved from https://www.machinedesign.com/batteriespower-supplies/what-s-difference-between-batteries-and-capacitors (Year: 2015).
Machine translation of WO 2011-138156, Huber et al. (Year: 2011).
First Office Action for Chinese Application 201780027727.0 dated Dec. 3, 2020, 6 pages.

\* cited by examiner

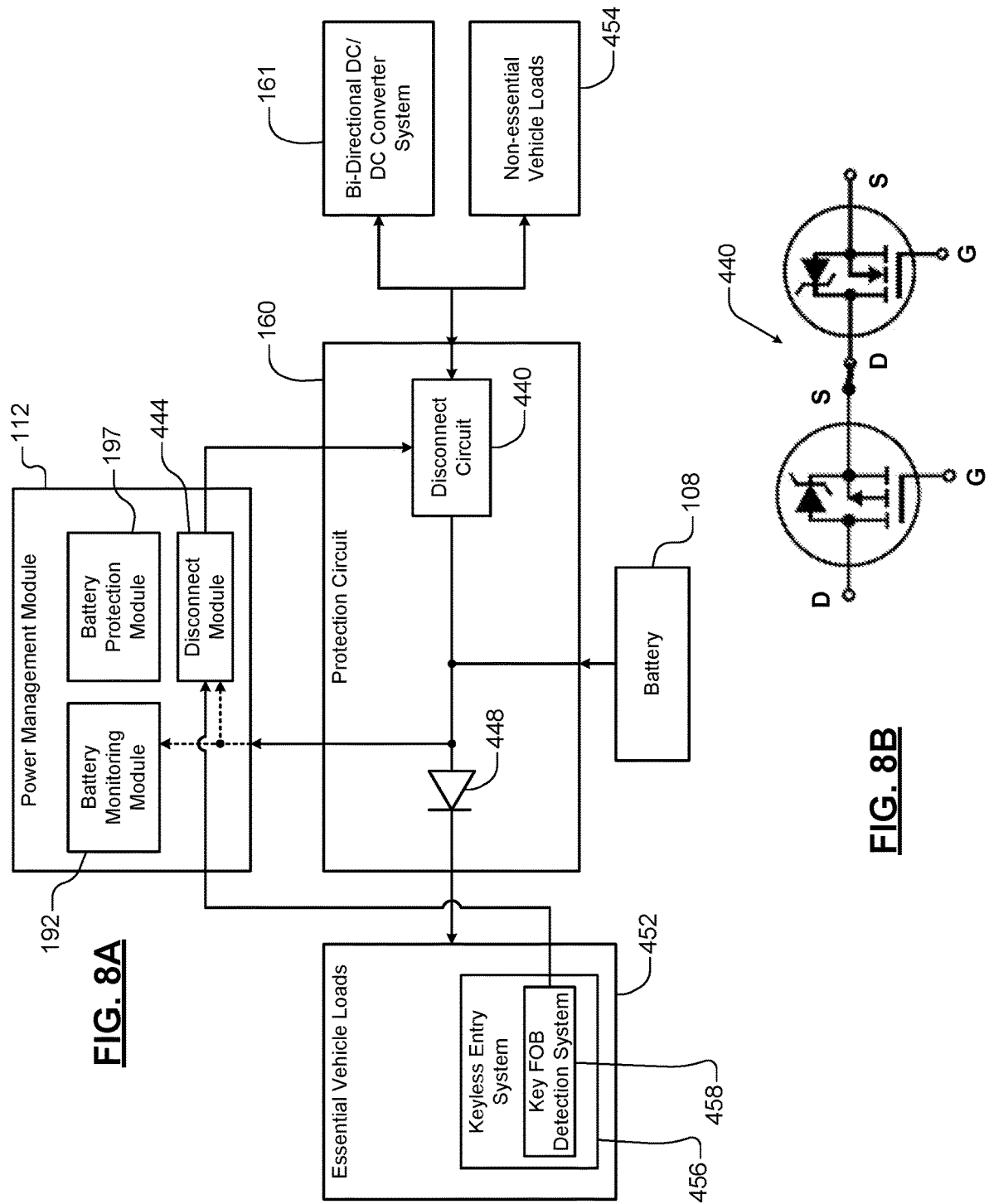

SYSTEMS AND METHODS FOR SUPPLYING POWER IN A HYBRID VEHICLE USING CAPACITORS, A BATTERY AND ONE OR MORE DC/DC CONVERTERS

CROSS-REFERENCE TO RELATED APPLICATIONS

The present disclosure is a divisional of U.S. patent application Ser. No. 15/434,765 filed on Feb. 16, 2017, which claims the benefit of U.S. Provisional Application No. 62/336,056, filed on May 13, 2016, U.S. Provisional Application No. 62/302,372, filed on Mar. 2, 2016, and U.S. Provisional Application No. 62/302,386, filed on Mar. 2, 2016. The entire disclosure of each of the above applications is incorporated herein by reference.

This application is related to U.S. application Ser. No. 15/208,112, filed on Jul. 2, 2016, and U.S. application Ser. No. 15/208,143, filed on Jul. 12, 2016. The entire disclosure of each of the above applications is incorporated herein by reference.

FIELD

The present disclosure relates to hybrid vehicles and more particularly to systems and methods for supplying power in a hybrid vehicle using capacitors, a battery and one or more DC/DC converters.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid vehicles typically use a powertrain system including an engine, a stop-start or mild hybrid system including a starter/generator and/or one or more electric motors for propelling the vehicle. During operation, current is supplied to start the engine, to supply loads connected to a vehicle power bus, to restart the engine, to drive the electric motors or starter generator to move the vehicle and/or to recharge the batteries. For example in some mild hybrids, the electric motors or starter generator drive the vehicle for brief periods such as 1-2 seconds during restarts to eliminate engine hesitation as the engine cranks, starts and reaches idle or other engine speed (hereinafter referred to as e-boost). As a result, significant engineering effort has been invested to improve the battery systems of hybrid vehicles to meet the increasing current loads.

The automotive industry has also proposed using batteries operating at higher voltage levels such as 24V, 36V and 48V and/or systems incorporating supercapacitors or ultracapacitors. However, these systems are fairly complex since they still need to operate with legacy 12V vehicle systems and components.

Some vehicle battery systems include a 12V battery in addition to a higher voltage battery, a supercapacitor or an ultracapacitor. However, these systems require a full capacity 12V battery, such as 100 Ah, in addition to the higher voltage battery, supercapacitor or ultracapacitor.

SUMMARY

The present disclosure describes a system for controlling connections between a battery of a hybrid vehicle and at least one of a capacitor of the vehicle and electrical loads of the vehicle, where the electrical loads include essential loads and nonessential loads. The system includes a battery monitoring module and a battery protection module. The battery monitoring module determines the state of charge of the battery. The battery protection module monitors the state of charge of the battery when the vehicle is off. The battery protection module disconnects the nonessential loads from the battery while maintaining a connection between the essential loads and the battery when the state of charge of the battery is less than a first state of charge threshold.

In one aspect, the battery protection module reconnects the nonessential loads to the battery when an engine start is likely to occur within a predetermined period.

In another aspect, the system further includes a capacitor charge/discharge. The capacitor charge/discharge module determines whether a state of charge of a capacitor of the vehicle is greater than a capacitor state of charge threshold. The capacitor charge/discharge module charges the capacitor using power from the battery when an engine start is likely to occur and the state of charge of the capacitor is less than the capacitor state of charge threshold.

In another aspect, the battery protection module disconnects the nonessential loads from the battery for a second time when the engine start does not occur within a predetermined period after the nonessential loads are reconnected to the battery.

In another aspect, the essential loads are associated with at least one of vehicle power management, vehicle access, and vehicle starting.

In other aspects, the battery protection module determines whether the state of charge of the battery is less than a second state of charge threshold, where the second state of charge threshold is less than the first state of charge threshold. The battery protection module sends a message to an owner of the vehicle to request an engine start when the state of charge of the battery is less than the second state of charge threshold.

In other aspects, the system further includes a DC/DC converter and a disconnect circuit. The DC/DC converter controls flow of current between the battery, the capacitor, and at least one of a starter of the vehicle and a generator of the vehicle. The disconnect circuit disconnects the nonessential loads and the DC/DC converter from the battery based on a signal sent by the battery protection module.

In another aspect, the disconnect circuit includes a bi-stable relay.

In another aspect, the disconnect circuit includes P-channel MOSFETs and N-channel MOSFETs that are connected in series.

In another aspect, the system further comprises a diode that allows current flow in a first direction from the battery to the essential loads and prevents current flow in a second direction that is opposite of the first direction.

The present disclosure also describes a system for discharging or charging a capacitor of a hybrid vehicle. The system includes a target state of charge (SOC) module and a capacitor charge/discharge module. The target SOC module determines a target state of charge of the capacitor based on a speed of the vehicle. The capacitor charge/discharge module determines whether a state of charge of a capacitor is greater than a target state of charge. The capacitor charge/discharge module dissipates power from the capacitor to at least one of a battery of the vehicle and an electrical load of the vehicle when the state of charge of the capacitor is greater than the target state of charge.

In one aspect, the electrical load includes a thermal electric device.

In another aspect, the target SOC module determines the target state of charge further based on a ratio of an amount of friction braking used in the vehicle relative to an amount of regenerative braking used in the vehicle.

In other aspects, the system further includes a DC/DC boost converter and a DC/DC buck converter that are connected between the battery, the capacitor, and at least one of a starter of the vehicle and a generator of the vehicle. The capacitor charge/discharge module disables the DC/DC boost converter and enables the DC/DC buck converter to discharge the capacitor.

In other aspects, the capacitor charge/discharge module determines whether the state of charge of the capacitor is within a predetermined range of the target state of charge. The capacitor charge/discharge module dissipates power from the capacitor to at least one of the battery and the load when the state of charge of the capacitor is greater than the target state of charge and outside of the predetermined range.

In another aspect, the capacitor charge/discharge module charges the capacitor using power from at least one of a battery of the vehicle and a generator of the vehicle when the state of charge of the capacitor is less than the target state of charge and outside of the predetermined range.

In other aspects, the system further includes a DC/DC boost converter and a DC/DC buck converter that are connected between the battery, the capacitor, and at least one of a starter of the vehicle and the generator of the vehicle. The capacitor charge/discharge module enables the DC/DC boost converter and disables the DC/DC buck converter to charge the capacitor.

The present disclosure describes another system for discharging or charging a capacitor of a hybrid vehicle. The system includes a capacitor monitoring module and a capacitor charge/discharge module. The capacitor monitoring module monitors a state of charge of a capacitor. The capacitor charge/discharge module determines whether the state of charge of the capacitor is less than a capacitor state of charge threshold. The capacitor state of charge threshold is based on an amount of power that the capacitor supplies to at least one of a starter of the vehicle and a generator of the vehicle during cranking of the engine. The capacitor charge/discharge module charges the capacitor using power from at least one of a battery of the vehicle and the generator of the vehicle when the state of charge of the capacitor is less than the capacitor state of charge threshold.

In one aspect, the capacitor charge/discharge module determines whether the state of charge of the capacitor is less than the capacitor state of charge threshold in response to a vehicle start request.

In other aspects, the system further includes a DC/DC boost converter and a DC/DC buck converter that are connected between the battery, the capacitor, and at least one of the starter and the generator. The capacitor charge/discharge module enables the DC/DC boost converter and disables the DC/DC buck converter to charge the capacitor.

In another aspect, the capacitor charge/discharge module determines whether the state of charge of the capacitor is less than the capacitor state of charge threshold in response to an engine stop request.

The present disclosure also describes a method for controlling connections between a battery of a hybrid vehicle and at least one of a capacitor of the vehicle and electrical loads of the vehicle, where the electrical loads include essential loads and nonessential loads. The method includes monitoring a state of charge of the battery when the vehicle is off and determining whether the state of charge of the battery is less than a first state of charge threshold. The method further includes disconnecting the nonessential loads from the battery while maintaining a connection between the essential loads and the battery when the state of charge of the battery is less than the first state of charge threshold.

In other aspects, the method further includes determining whether an engine start is likely to occur, and reconnecting the nonessential loads to the battery when an engine start is likely to occur within a predetermined period.

In other aspects, the method further includes determining whether a state of charge of a capacitor of the vehicle is greater than a capacitor state of charge threshold, and charging the capacitor using power from the battery when an engine start is likely to occur and the state of charge of the capacitor is less than the capacitor state of charge threshold.

In another aspect, the method further includes disconnecting the nonessential loads from the battery for a second time when the engine start does not occur within a predetermined period after the nonessential loads are reconnected to the battery.

In another aspect, the essential loads are associated with at least one of vehicle power management, vehicle access, and vehicle starting.

In other aspects, the method further includes determining whether the state of charge of the battery is less than a second state of charge threshold, and sending a message to an owner of the vehicle to request an engine start when the state of charge of the battery is less than the second state of charge threshold. The second state of charge threshold is less than the first state of charge threshold.

The present disclosure also describes a method for discharging or charging a capacitor of a hybrid vehicle. The method includes determining a target state of charge of the capacitor based on a speed of the vehicle, and determining whether a state of charge of a capacitor is greater than a target state of charge. The method further includes dissipating power from the capacitor to at least one of a battery of the vehicle and an electrical load of the vehicle when the state of charge of the capacitor is greater than the target state of charge.

In one aspect, the electrical load includes a thermal electric device.

In another aspect, the method further includes determining the target state of charge further based on a ratio of an amount of friction braking used in the vehicle relative to an amount of regenerative braking used in the vehicle.

In other aspects, the method further includes determining whether the state of charge of the capacitor is within a predetermined range of the target state of charge, and dissipating power from the capacitor to at least one of the battery and the load when the state of charge of the capacitor is greater than the target state of charge and outside of the predetermined range.

In another aspect, the method further includes charging the capacitor using power from at least one of a battery of the vehicle and a generator of the vehicle when the state of charge of the capacitor is less than the target state of charge and outside of the predetermined range.

The present disclosure also describes a method for charging at least one of a capacitor of a hybrid vehicle and a battery of the vehicle. The method includes determining a capacitor state of charge threshold based on an amount of power that the capacitor supplies to at least one of a starter of the vehicle and a generator of the vehicle during cranking of an engine of the vehicle. The method further includes determining whether a state of charge of the capacitor is less than the capacitor state of charge threshold, and charging the capacitor using power from at least one of a battery of the vehicle and the generator of the vehicle when the state of charge of the capacitor is less than the capacitor state of charge threshold.

In one aspect, the method further includes determining whether the state of charge of the capacitor is less than the capacitor state of charge threshold in response to a vehicle start request.

In other aspects, the method further includes disabling an engine start when the state of charge of the capacitor is less than the capacitor state of charge threshold, and enabling the engine start when the state of charge of the capacitor is greater than or equal to the capacitor state of charge threshold.

In another aspect, the method further includes determining whether the state of charge of the capacitor is less than the capacitor state of charge threshold in response to an engine stop request.

In other aspects, the method further includes determining whether a state of charge of the battery is less than a battery state of charge threshold, and disabling an engine stop when the state of charge of the battery is less than the battery state of charge threshold.

In another aspect, the method further includes activating the generator and charging the battery and the capacitor when the state of charge of the battery is less than the battery state of charge threshold.

In other aspects, the method further includes determining whether a state of charge of the battery is less than a battery state of charge threshold and, when the battery is less than a battery state of charge threshold, outputting an engine start request command to an engine controller in order to charge the battery.

In other aspects, the method further includes determining whether increasing generator load increases system efficiency based on vehicle operating conditions, and operating a generator to recharge at least one of the capacitor and the battery when increasing generator load increases system efficiency.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 8A illustrates an example of a protection circuit according to the present disclosure;

FIG. 8B illustrates an example of a disconnect circuit according to the present disclosure;

In the drawings, reference numbers may be reused to identify similar and/or identical elements.

DETAILED DESCRIPTION

Figure 1:
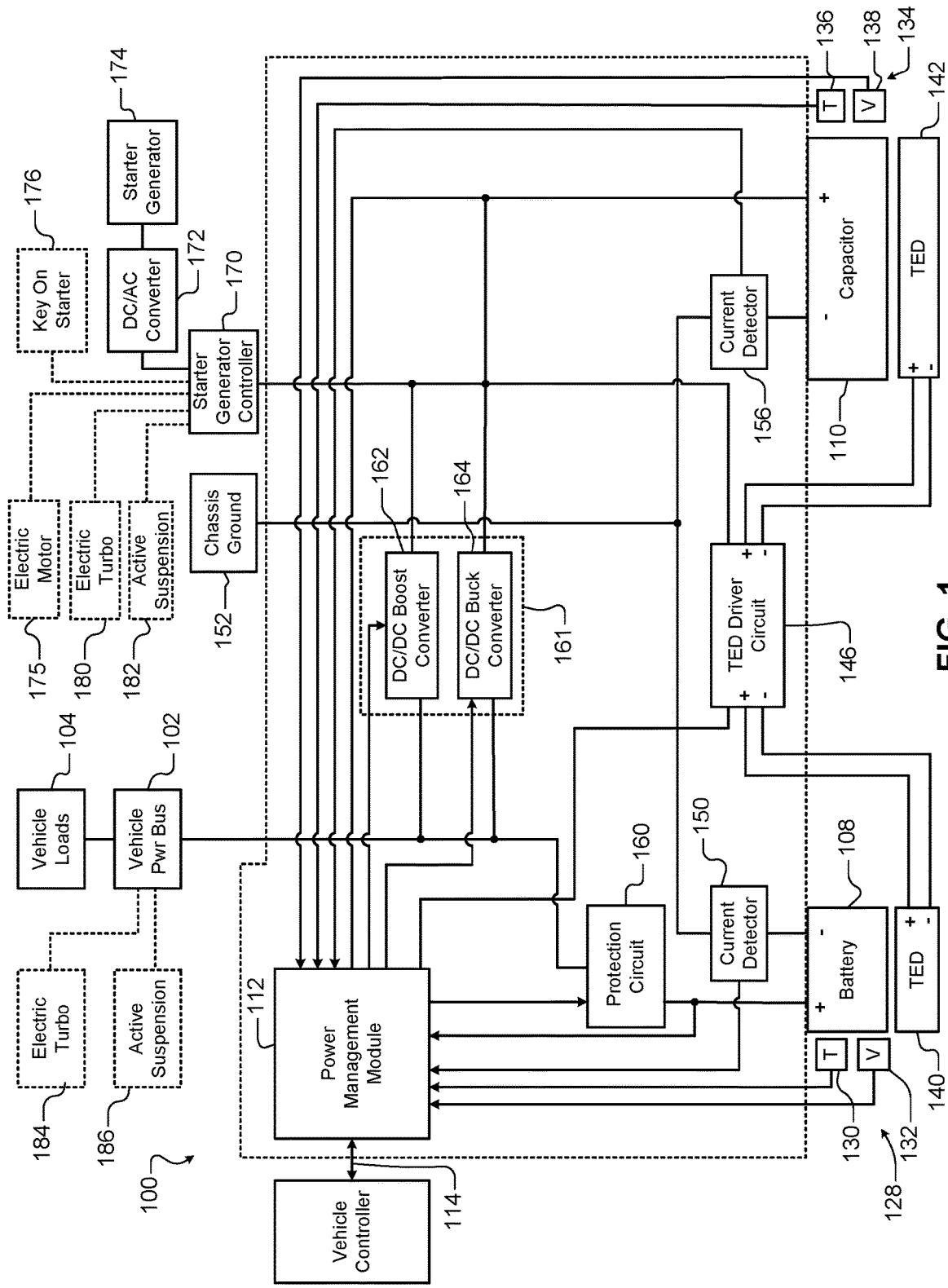
FIG. 1 is a functional block diagram of an example of a power management system for supplying power from and recharging of a battery and a capacitor according to the present disclosure.

In systems and methods for supplying power in a hybrid vehicle according to the present disclosure, higher current loads that occur during starting or e-boost events are predominantly supplied by capacitors such as supercapacitors or ultracapacitors. Current is also supplied by a battery at a limited and controlled rate during these events. As a result, the capacity and physical size of the battery can be substantially reduced while keeping the discharge rate (or C-rate) of the battery to a reasonable level.

In conventional battery systems, cranking after a "key-on" event is solely supported by the battery. As a result, the battery needs to have a sufficient capacity and discharge rate to handle the load. The discharge rate or C-rating is defined as a ratio of current/capacity. For example, a first battery can supply 850A and has a capacity of 100 Ah (C-rate of 850 A/100 Ah=8.5). In contrast, a second battery can supply 850A and has a capacity of 17 Ah (C-rate of 850 A/17 Ah=50). While both batteries supply the same amount of current, the second battery will have a significantly shorter battery life than the first battery in similar applications. In other words, the C-rate of the battery directly affects battery life and higher C-rates correspond to shorter battery life.

Unlike other hybrid battery topologies, the battery used in the power management system according to the present disclosure does not independently support key-on engine starting. The main function of the battery is to directly support vehicle loads such as boardnet loads. The battery also supplies controlled and limited current flow to indirectly support key-on engine starts and hybrid drive cycle events such as engine re-starting and/or electric boost. The battery is also used to recharge the capacitor after cranking.

Current supplied during regenerative/engine braking is used to recharge the capacitor rather than the battery. Power from the capacitor is fed to the battery at a limited and controlled rate over time, which reduces battery peak charge loads. In the systems and methods described herein, battery requirements are driven by energy rather than voltage drop at cranking amps, which allows a smaller capacity battery to be used.

The present disclosure can also be configured to support pulse-type vehicle loads, such as electric turbo systems or electric active suspension systems, by selectively supplying current from the capacitor via the starter/generator controller or the AC/DC converter. Having the capacitor supply the pulse-type vehicle loads improves battery life and minimizes the requirements, size and cost of the battery.

However, power stored in the capacitor tends to dissipate as a function of time. Therefore, the capacitor may need to be recharged after the vehicle is sitting for long periods without the engine running. As a result, the capacitor needs to be recharged by the batteries prior to an engine starting event. In some of the examples described below, the power management system predicts engine start or engine restart (after an engine stop/restart event) based on one or more sensed vehicle parameters and initiates recharging of the capacitor as soon as possible to reduce or eliminate delay once the driver or engine controller initiates engine start or restart.

In addition, the power management system improves efficiency by moving stored power from the capacitor to the battery or vehicle loads such as the TEDs prior to regeneration events. As a result, the power produced during the regenerative braking events can be used to charge the capacitor. In some examples, the power management system determines a target capacitor SOC based on a function of vehicle speed. In some examples, the target capacitor SOC is based in part on the amount of power that can be absorbed by the capacitor when a regeneration event occurs at the vehicle speed.

During engine stop/restart events, the power management module initiates recharging of the capacitor (if needed) after the engine stop event occurs and prior to restart.

In some examples, the power management system also disconnects nonessential vehicle loads when the vehicle is not started during longer periods of time. When the power management module predicts that an engine start may occur soon, the power management module reconnects the previously disconnected loads and recharges the capacitor if needed to prepare for the engine start event.

The specifications of the battery can be varied based on the severity of the hybrid drive cycle and pulse-type boardnet loads that are expected for a given application. In general, the battery requirements, size and cost will be lower than hybrid topologies where the battery directly or substantially contributes to the hybrid drive cycle.

The packaging cost of the battery and wiring are greatly reduced though integration of the battery into an integrated battery and capacitor assembly. Additional operating details of the integrated battery and capacitor system can be found in U.S. Provisional Application No. 62/302,372, filed on Mar. 2, 2016. Additional packaging details of the integrated battery and capacitor assembly can be found in U.S. Provisional Application No. 62/302,386, filed on Mar. 2, 2016.

Referring now to FIG. 1, a power management system 100 for controlling the supply of power from and recharging of a battery 108 and a capacitor 110 is shown. In some examples, the battery includes a 12 V battery including multiple battery cells connected in series and/or parallel to positive and negative battery terminals. In some examples, the battery cells are made using lithium iron phosphate (LiFePO$_4$) chemistry. In other examples, the battery cells are made using lithium titanate (Li$_4$Ti$_5$O$_{12}$) (LTO) chemistry, or any other lithium ion chemistry. In some examples, the battery 108 includes pouch cells arranged in a 4sNp configuration. VDA style can cells could also be used. In some examples, the battery 108 provides 12.8 V nominal (8.0V to 14.4 V) and has a capacity of 20 Ah/256 Wh. In other examples, the battery has a capacity less than or equal to 20 Ah and a C-rate less than or equal to 6.

In some examples, the capacitor 110 includes multiple capacitor cells connected in series and/or parallel to positive and negative capacitor terminals. In some examples, the capacitor 110 includes supercapacitors or ultracapacitors. In some examples, the capacitor 110 provides 12V, 24V, 36V, or 48V nominal (0-54 V). In some examples, a pouch cell format is used for capacitor cells in the capacitor. In other examples, a VDA can cell format is used for capacitor cells in the capacitor. In some examples, the capacitors are connected in an 18sNp configuration and have a capacity of 0.6 Ah (30 Wh).

A power management module 112 controls the supply of power from and recharging of the battery 108 and the capacitor 110. The power management module 112 may communicate over a vehicle data bus 114 with other vehicle controllers and/or with components of the power management system 100. The power management module 112 may transmit data such as state of charge (SOC) and state of health (SOH) for the battery 108 and the capacitor 110 to other vehicle controllers. In some examples, the vehicle data bus 114 includes a CAN bus, although other data bus types can be used. In some examples, the power management module 112 receives information such as key-on events, vehicle speed, drive mode events, engine oil temperature, regeneration events, e-boost events or other control information from other vehicle controllers. Vehicle speed may be indicative of a future regeneration event. Engine oil temperature may be indicative of engine load during cranking. The power management module 112 may adjust operation of the power management system 100 based on these signals.

In some operating modes, the power management module 112 also controls the supply of current to a vehicle power bus 102 and vehicle loads 104 such as boardnet loads. The power management module 112 receives battery operating parameters from one or more sensors 128 such as temperature sensors 130 and/or voltage sensors 132. In some examples, the temperature sensors 130 and the voltage sensors 132 monitor temperatures and voltages at the battery cell level. The power management module 112 also receives capacitor operating parameters from sensors 134 such as temperature sensors 136 and/or voltage sensors 138. In some examples, the temperature sensors 136 and the voltage sensors 138 monitor temperatures and voltages at the capacitor cell level.

Temperature control of the battery 108 and/or the capacitor 110 may be provided by thermoelectric devices (TEDs) 140 and 142, respectively. A TED driver circuit 146 controls to the TEDs 140 and 142. The power management module 112 selectively actuates the TED driver circuit 146 as needed to control the temperature of the battery 108 and the capacitor 110. In some examples, the TEDs 140 and/or 142 include one or more heating/cooling zones that allow individual and independent temperature control of one or more battery cells or capacitor cells.

A current detector circuit 150 detects current supplied by the battery or supplied to the battery during recharging. The current detector circuit 150 may be arranged between a negative terminal of the battery 108 and chassis ground 152. A current detector circuit 156 detects current supplied by the capacitor 110 or supplied to the capacitor 110 during recharging. The current detector circuit 156 may be arranged between a negative terminal of the capacitor 110 and the chassis ground 152. The current detector circuits 150 and 156 provide sensed battery current and capacitive current values, respectively, to the power management module 112.

A protection circuit 160 may be arranged between a positive terminal of the battery 108 and loads such as the vehicle power bus 102. The protection circuit 160 monitors a voltage output of the battery and provides a voltage value to the power management module 112. The protection circuit 160 protects the battery from overcharging when one or more cells are at or above a voltage limit of the battery cell. Another function of the protection circuit 160 is to protect the battery from excessive current. If an over voltage condition is detected, the battery 108 may be disconnected or other actions may be taken. For example, excessive voltage or current may occur during charging with an external charger.

In some examples, the power management module 112 performs battery management including cell voltage measurement, cell balancing, temperature measurement, current limits calculations, state of charge (SOC) estimation and/or state of health (SOH) estimation based on the measured battery parameters. In some examples, the power management module 112 also performs capacitor management including cell voltage measurement, cell balancing, temperature measurement, current limits calculations, SOC estimation and/or SOH estimation based on measured capacitor parameters.

A DC/DC converter 161 may be provided to control flow of the current between the battery 108, the capacitor 110 and/or a starter/generator 174. In some examples, the DC/DC converter 161 includes a DC/DC boost converter 162 and a DC/DC buck converter 164 that are connected between the battery 108, the capacitor 110 and the starter/generator 174. In some examples, the DC/DC boost converter 162 has an input range of 8V to 16V and a current input range of 0-100 Amps. In some examples, the DC/DC boost converter 162 has an output range of 24V to 54V and a current output range of 0-67 Amps.

In some examples, the DC/DC buck converter 164 has an input range of 24V to 54V and a current input range of 0-53 Amps. In some examples, the DC/DC buck converter 164 has an output range of 8V to 16V and a current output range of 0-80 Amps. As can be appreciated, the ratings of the DC/DC boost converter 162 and the DC/DC buck converter 164 will vary for different applications.

A starter/generator controller 170 is connected to the DC/DC boost converter 162, the DC/DC buck converter 164, and the capacitor 110. The starter/generator controller 170 is also connected to a DC/AC converter 172, which is connected to the starter/generator 174. The starter/generator 174 is connected to an engine (not shown). In some examples, one or more electric motors 175 for driving the wheels may be provided.

The vehicle power bus 102 may also be connected to an electric turbo 184 and/or an active suspension system 186, which operate at the voltage of the battery 108. Alternately, an electric turbo 180 and/or an active suspension system 182 may be connected to the starter/generator controller 170 or the AC/DC converter if they operate at higher voltages such as 24V, 36V, 48V, etc.

In some examples, a key-on starter 176 may be connected to the starter/generator controller 170 and may be provided for starting larger displacement engines requiring higher starting current. The key-on starter 176 may be supplied by current from the capacitor 110 and assisted in a limited and controlled manner by current supplied by the battery 108 as described above. For example, the power management module 112 may supply a first amount of power from the battery 108 to the starter generator 174 and/or the key-on starter 176 during engine cranking and supply a second amount of power from the capacitor 110 to the starter generator 174 and/or the key-on starter 176 during engine cranking, where the second amount of power is greater than the first amount of power.

Figure 2:
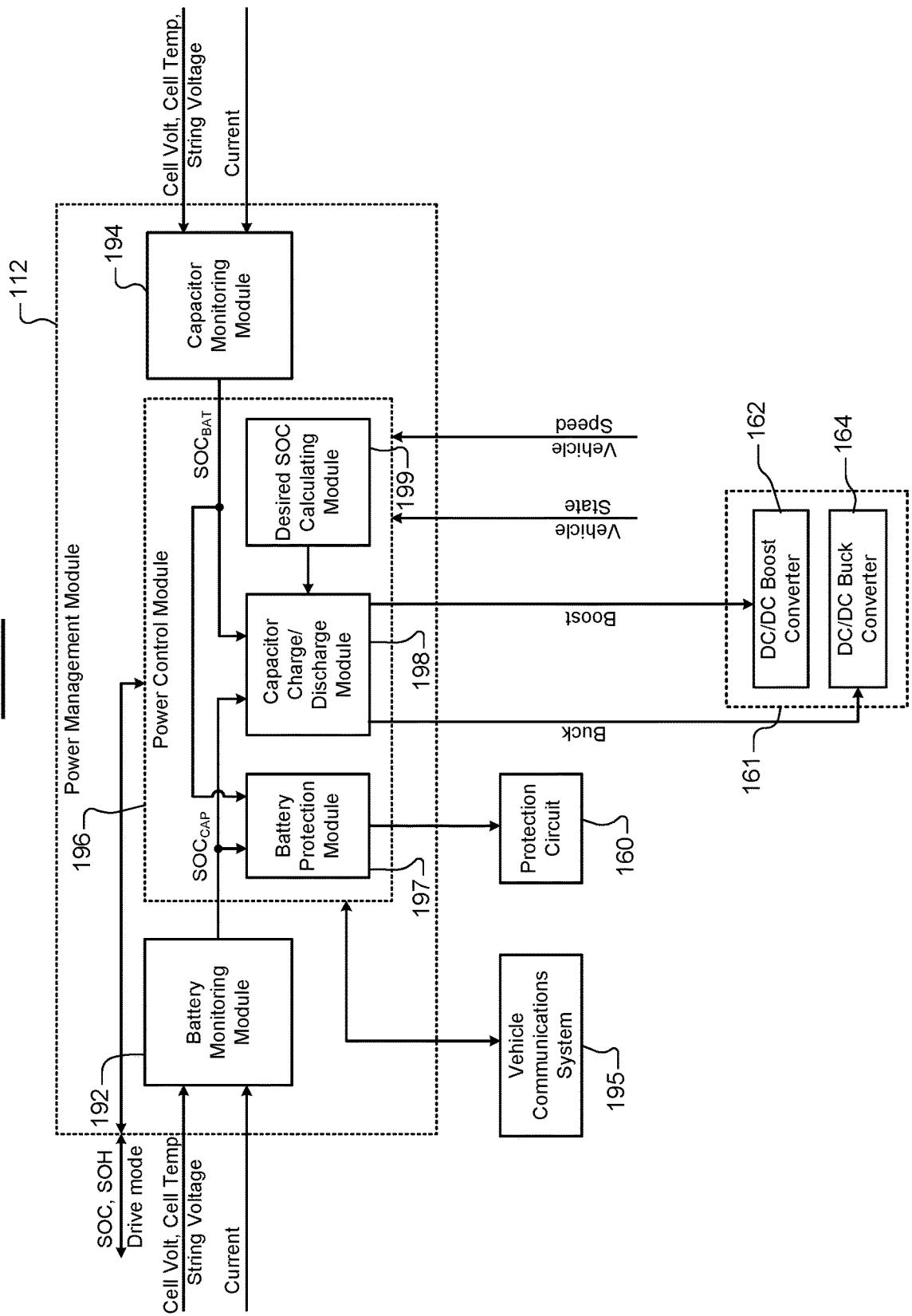
FIG. 2 is a more detailed functional block diagram of an example of a power management module in FIG. 1.

Referring now to FIG. 2, an example of the power management module 112 is shown in further detail. The power management module 112 includes a battery monitoring module 192, a capacitor monitoring module 194 and a power control module 196.

The battery monitoring module 192 receives cell voltages, battery current, cell temperatures and/or string voltage as described above in FIG. 1. The battery monitoring module 192 performs cell balancing, calculates state of charge (SOC) and/or state of health (SOH) values for the battery 108. The capacitor monitoring module 194 also receives cell voltages, capacitor current, cell temperatures and/or string voltage as described above in FIG. 1. The capacitor monitoring module performs cell balancing, calculates SOC and/or calculates SOH for the capacitor 110.

The power control module 196 communicates with the battery monitoring module 192 and the capacitor monitoring module 194. The power control module 196 may also receive information such as key-on events, vehicle speed, engine oil temperature, drive mode events, regeneration events, e-boost events or other control information from other vehicle controllers via the vehicle data bus 114. The power control module 196 may also share SOC and SOH values for the battery 108 and the capacitor 110 with other vehicle controllers via the vehicle data bus 114.

The power control module 196 enables and disables the DC/DC converter 161. For example, the control module enables and disables the DC/DC buck converter 164 and the DC/DC boost converter 162 as needed during the various drive or operating modes. The power control module 196 also monitors operation of the protection circuit 160. The power control module 196 also communicates with the TED driver circuit 146 to control heating/cooling of zones in the TEDs 140 and 142 associated with the battery 108 and the capacitor 110.

The power control module 196 further includes a battery protection module 197 that monitors battery SOC while the vehicle is OFF and selectively disconnects vehicle loads from the battery (other than essential vehicle loads) to further reduce the rate of parasitic current drain. In some examples, the battery protection module 197 reconnects the previously disconnected vehicle loads when an engine start occurs or is likely to occur within a predetermined period. For example, an engine start is likely to occur if the key FOB is detected within a predetermined vicinity of the vehicle and/or when doors of the vehicle are opened, etc. In some examples, when the engine is likely to be started within a predetermined period, the battery protection module 197 reconnects the disconnected vehicle loads and charges the capacitor if needed. If the expected engine start does not occur within a predetermined period, the nonessential loads are disconnected.

In addition, the battery protection module 197 monitors the battery state of charge and notifies the vehicle owner using a vehicle communication system 195 (such as a cellular, satellite-based, or WiFi communication system) that the engine should be restarted soon to recharge the battery to prevent the battery from draining to a point where an engine start is not possible. In some examples, a text or e-mail message may be sent to the vehicle owner. In other examples, an alert and/or notification is sent to an application on a smartphone associated with the vehicle owner. In some examples, the text, e-mail, alert and/or notification notifies the vehicle owner that the engine should be restarted as soon as possible. In other examples, the text, e-mail, alert and/or notification indicates the charge state of the battery and requests permission to remotely start the engine and recharge the battery for a predetermined period if the vehicle is in a suitable location. For example, the vehicle may be in a suitable location to start the engine if the vehicle is outside, in a ventilated location or other suitable location.

The power control module 196 further includes a capacitor charge/discharge module 198 that selectively discharges the capacitor under certain operating conditions in anticipation of a capacitor recharge event. The capacitor charge/discharge module 198 selectively charges the capacitor in anticipation of an engine start or restart event under other operating conditions. For example, when the vehicle is travelling at a high rate of speed and the capacitor has a high SOC, the capacitor is at least partially discharged since the next likely event will likely include a regeneration event. The available energy from the regeneration event is based on the kinetic energy of the vehicle and the ratio of friction (or foundation) braking relative to regenerative braking that is used.

The capacitor is discharged by either recharging the battery or dissipating power in vehicle loads. For example, the vehicle loads may include the TEDs. The power control module 196 further includes a desired SOC calculating module 199 that determines a desired capacitor SOC based on vehicle speed or a function of vehicle speed or one or more vehicle parameters or operating states, as will be described further below.

Figure 3:
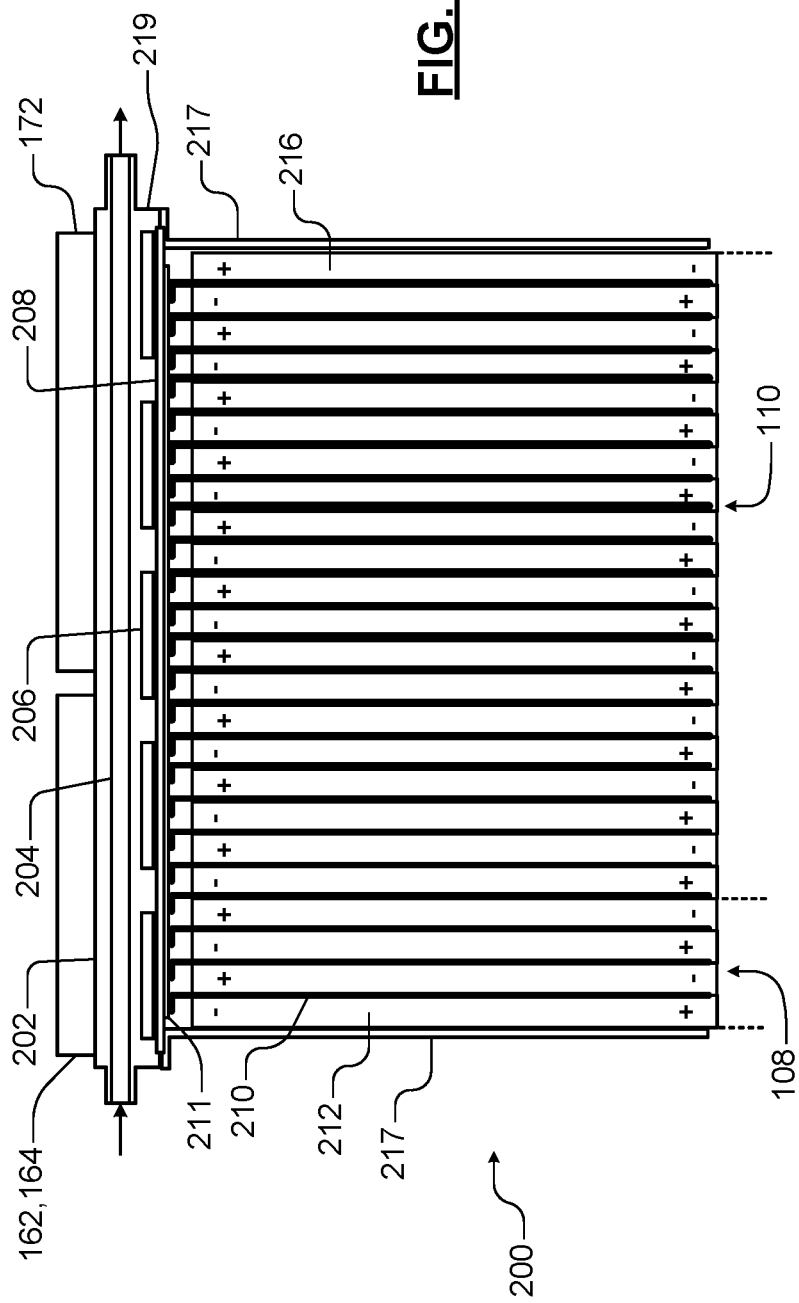
FIG. 3 is a cross-sectional view of an integrated battery and capacitor assembly with heating and cooling capability according to the present disclosure.

Referring now to FIG. 3, an example of a battery and capacitor assembly 200 is shown. The battery 108 and the capacitor 110 include cells 212 and 216, respectively, that are arranged adjacent one another between mounting brackets 217. The cells 212 and 216 may include pouch-type cells. Heatsinks 210 are arranged between the cells 212 and 216 to dissipate heat. In some examples, the heatsinks 210 are generally "L"-shaped. The mounting brackets 217 are mounted alongside outwardly-facing surfaces of outer ones of the cells 212 and 216 and ends of the mounting brackets 217 are mounted to a cooling plate assembly 219. The mounting brackets 217 provide compressive force on the pouch-type capacitive and battery cells located therebetween during operation.

The cooling plate assembly 219 includes a heat spreader 208 which dissipates or spreads out hot or cold spots along surfaces thereof to equalize temperature variation. In some examples, the heat spreader 208 may also be split into zones with thermal separation therebetween so that the battery and the capacitor may be maintained at different temperatures. Ends of the heatsinks 210 are in thermal contact with the heat spreader 208. Alternately, thermal interface material 211 may be arranged between the heatsinks 210 and the heat spreader 208. If used, the thermal interface material 211 may include a foam gap pad, thermal grease, a two-part thermal filler, graphite foil, filled silicone sheet or other suitable material.

In other examples, thermal interface material (not shown) may be arranged between the DC/DC boost and buck converters 162 and 164 and the cooling plate assembly 219. Thermal Interface material (not shown) may also be arranged between the DC/AC converter 172 and the cooling plate assembly 219.

The cooling plate assembly 219 also includes embedded TEDs 206 that may be arranged and connected in one or more heating/cooling zones. The TEDs are generally compressed between the heat spreader 208 and the cooling plate assembly 219. The cooling plate assembly 219 further includes a coolant channel 204 through which cooling fluid flows. In some examples, the DC/DC boost converter 162 and the DC/DC buck converter 164 are in thermal contact (or a heat exchange relationship) with an outer surface of the cooling plate assembly 219. Likewise, the DC/AC converter 172 is also in thermal contact or a heat exchange relationship with the outer surface of the cooling plate assembly 219. Additional packaging details can be found in U.S. Application No. 62/302,386, filed on Mar. 2, 2016.

Figure 4:
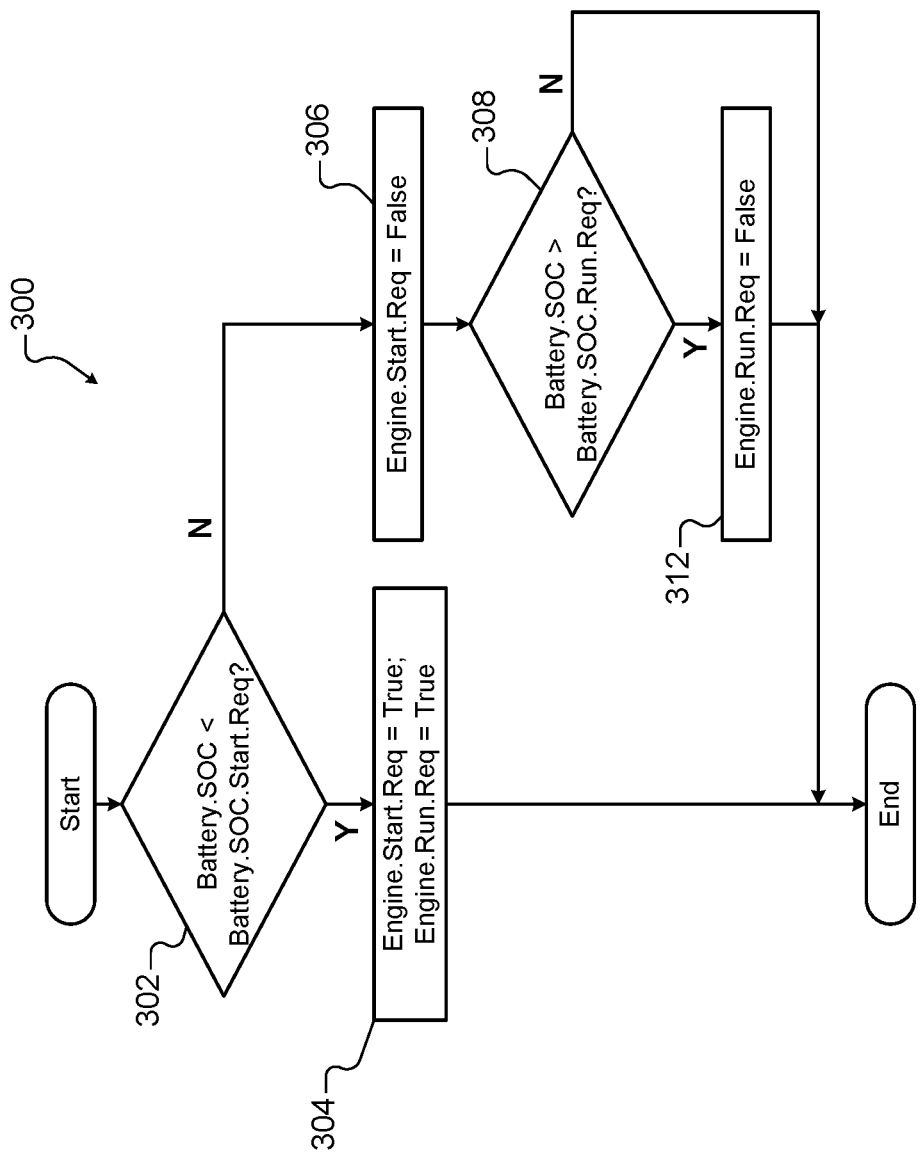
FIG. 4 is a flowchart illustrating an example of a method for determining engine start and run commands according to the present disclosure.

Referring now to FIG. 4, an engine start request command is output to an engine controller requesting an engine start event when the battery SOC is less than a battery SOC start request threshold. The engine start request command is used to charge the battery to a minimum SOC to enable key-off and engine restart. In some examples, the battery SOC start request is equal to 30% battery SOC, although other values can be used. An engine run request command is output to the engine controller to request the engine remain running to charge the battery to the battery SOC run request threshold. The engine run request command is used to charge the battery to a minimum SOC to support engine off vehicle loads. In some examples, the engine run request threshold is 50% battery SOC, although other values can be used.

A method 300 determines states of the engine run request and engine start request commands. At 302, the method determines whether the battery SOC is less than the battery SOC start request. If 302 is true (engine start is justified), the start request to set equal to true and the engine run request is set equal to true at 304. If 302 is false (engine start is not justified), the engine start request to set equal to false at 306. The method determines whether the battery SOC is greater than the battery SOC run request at 308. When 308 is true (the battery is charged), the engine run request is set equal to false at 312 and the method returns. When 308 is false (the battery is not charged), the method returns without resetting the engine run request.

Figure 5:
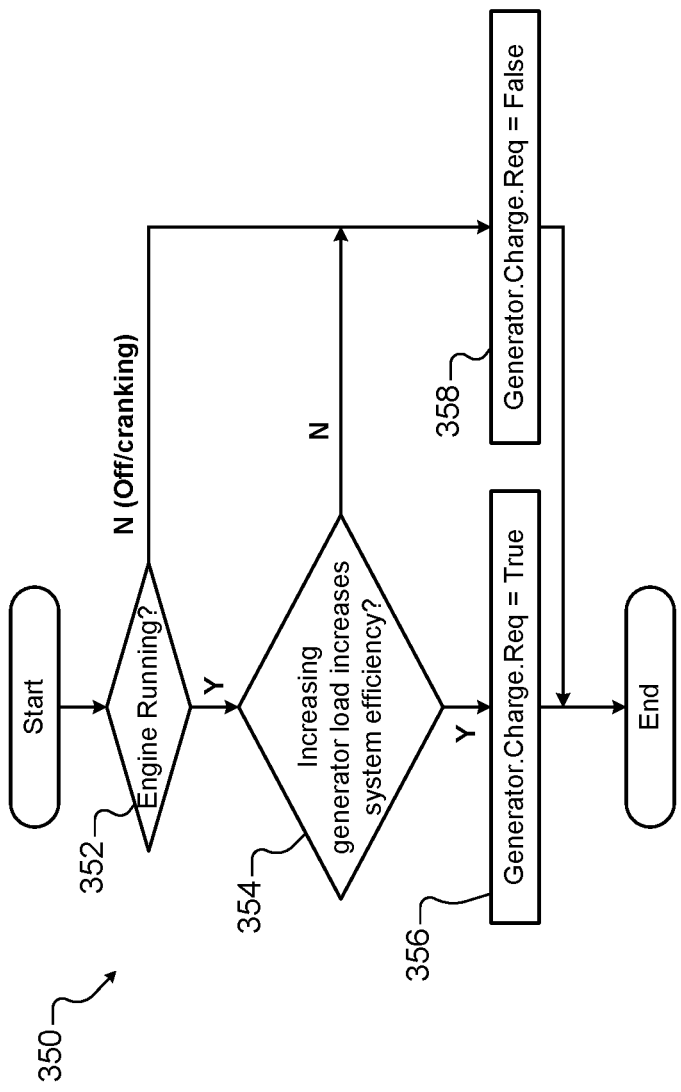
FIG. 5 is a flowchart illustrating an example of a method for determining when to operate a generator to recharge a capacitor or battery according to the present disclosure.

Referring now to FIG. 5, a method 350 for determining when to operate a generator to recharge the capacitor or the battery is shown. At 352, the method determines whether the engine is running. If 352 is true, the method determines whether increasing generator load under the vehicle operating conditions increases system efficiency at 354. If 354 is true, the generator charge request is set equal to true at 356. If either 352 or 354 are false, the generator charge request to set equal to false at 358. In some examples, the decision to operate the generator is based on engine state (off, cranking, running), engine speed and load. The generator current and load power are selected based on the DC/DC converter capability, vehicle loads, TED loads and other considerations.

There are situations where both engine run request and engine start request (in FIG. 4) are both false and yet the engine is running anyway. In some examples when this situation occurs, the battery is charged up to a predetermined SOC. The predetermined SOC may be a maximum operational SOC. The method in FIG. 4 builds in some hysteresis such that once the battery has requested an engine start to charge the battery, the engine stays running long enough to charge the battery to a predetermined SOC that will not require another engine start for a predetermined duration. The hysteresis reduces engine start and stop cycling to improve overall operation. This is not the same as topping off the battery, which could be done when in the engine is running due to the needs of the drive cycle and not just based on the battery's request.

Figure 6:
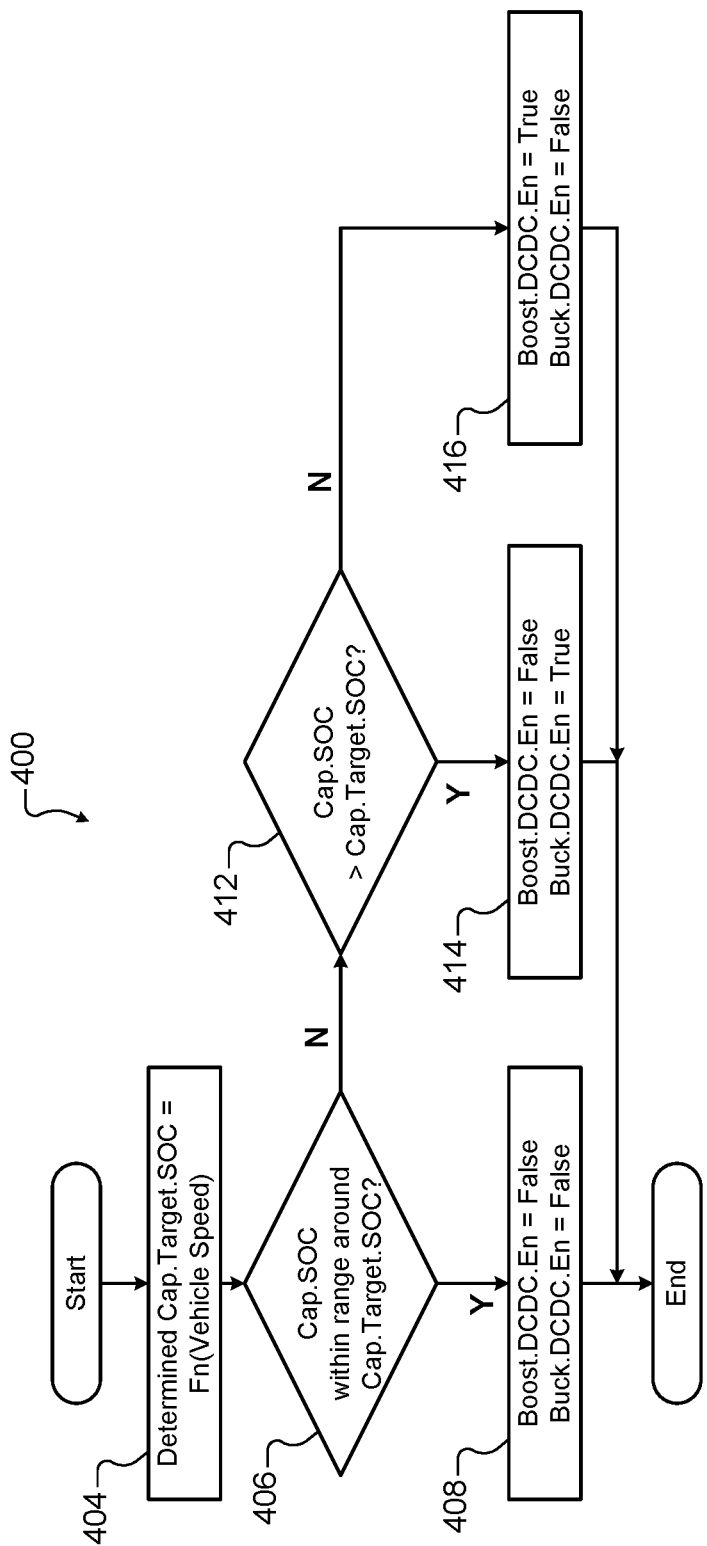
FIG. 6 is a flowchart illustrating an example of a method for charging or discharging the capacitor according to the present disclosure.

Referring now to FIG. 6, a method 400 for charging or discharging the capacitor as a function of vehicle speed is shown. In some examples when the capacitor is discharged, the capacitor discharges power into the battery and/or is discharged by vehicle loads such as the TEDs. In some examples when the capacitor is charged, the capacitor is charged by the battery or generator. When the vehicle speed is high, a lower capacitor SOC target is used. When the vehicle speed is low, a higher target capacitor SOC is used.

At 404, the capacitor target SOC is determined as a function of vehicle speed. At 406, the method determines whether the capacitor SOC is within a predetermined range around the capacitor target SOC. In some examples, the predetermined range is +/−5%, +/−2%, +/−1%, etc. of the capacitor target SOC. In other words, the capacitor SOC is about correct for the current operating conditions. If 406 is true, the boost and buck DC/DC converters are disabled since no power needs to be transferred.

If 406 is false, the capacitor SOC needs to be adjusted. The method continues with 412 and determines whether the capacitor SOC is greater than the capacitor target SOC. If 412 is true (the capacitor SOC is greater than desired), the boost DC/DC converter is disabled and the buck DC/DC converter is enabled at 414. This step initiates the transfer of power from the capacitor to the battery or other vehicle loads.

If 412 is false (the capacitor SOC is less than desired), the boost DC/DC converter is enabled and the buck DC/DC converter is disabled at 416. This step initiates the transfer of power from the battery or generator to the capacitor.

Figure 7A:
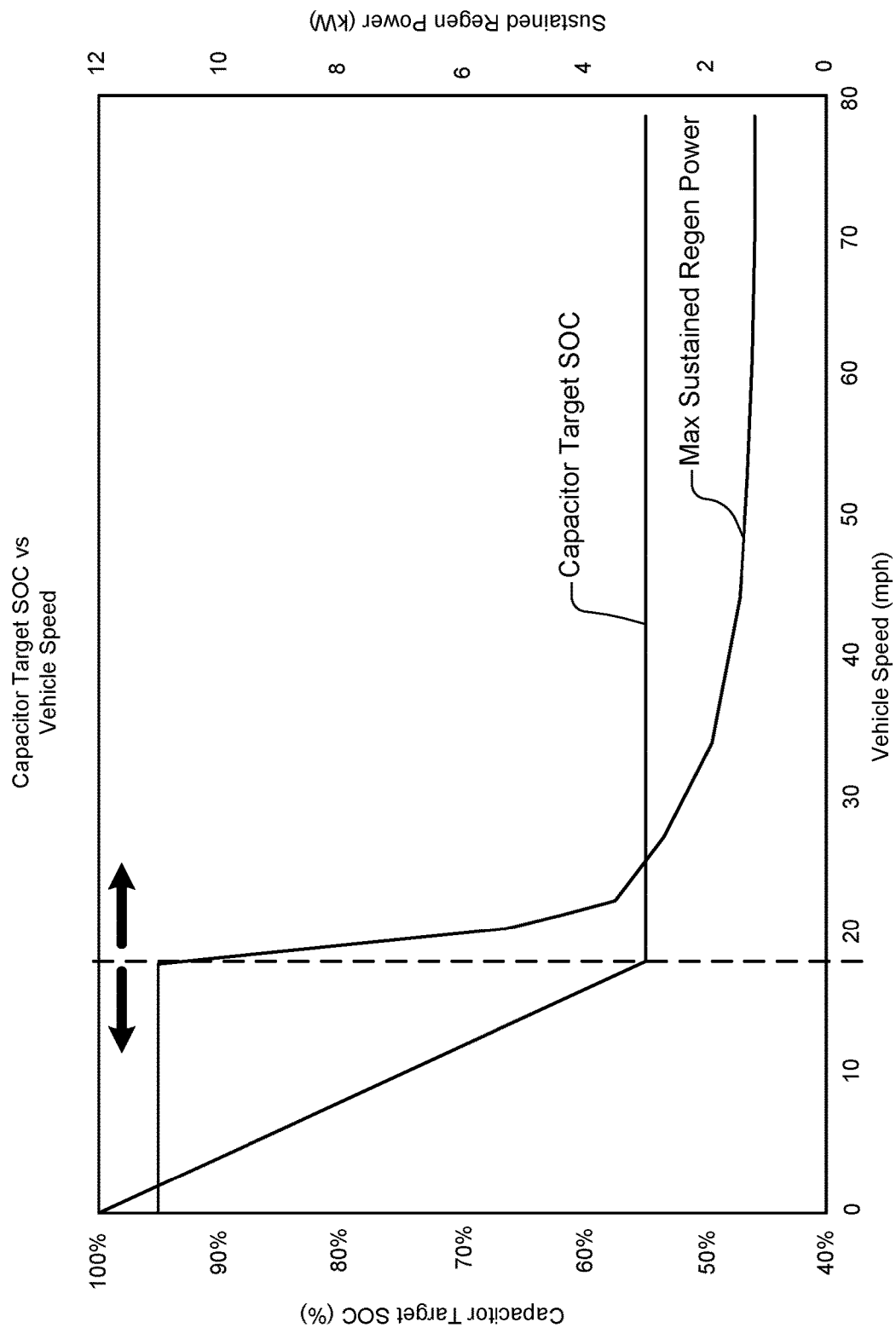
FIGS. 7A and 7B are graphs illustrating examples of capacitor target SOC as a function of vehicle speed according to the present disclosure.
Figure 7B:
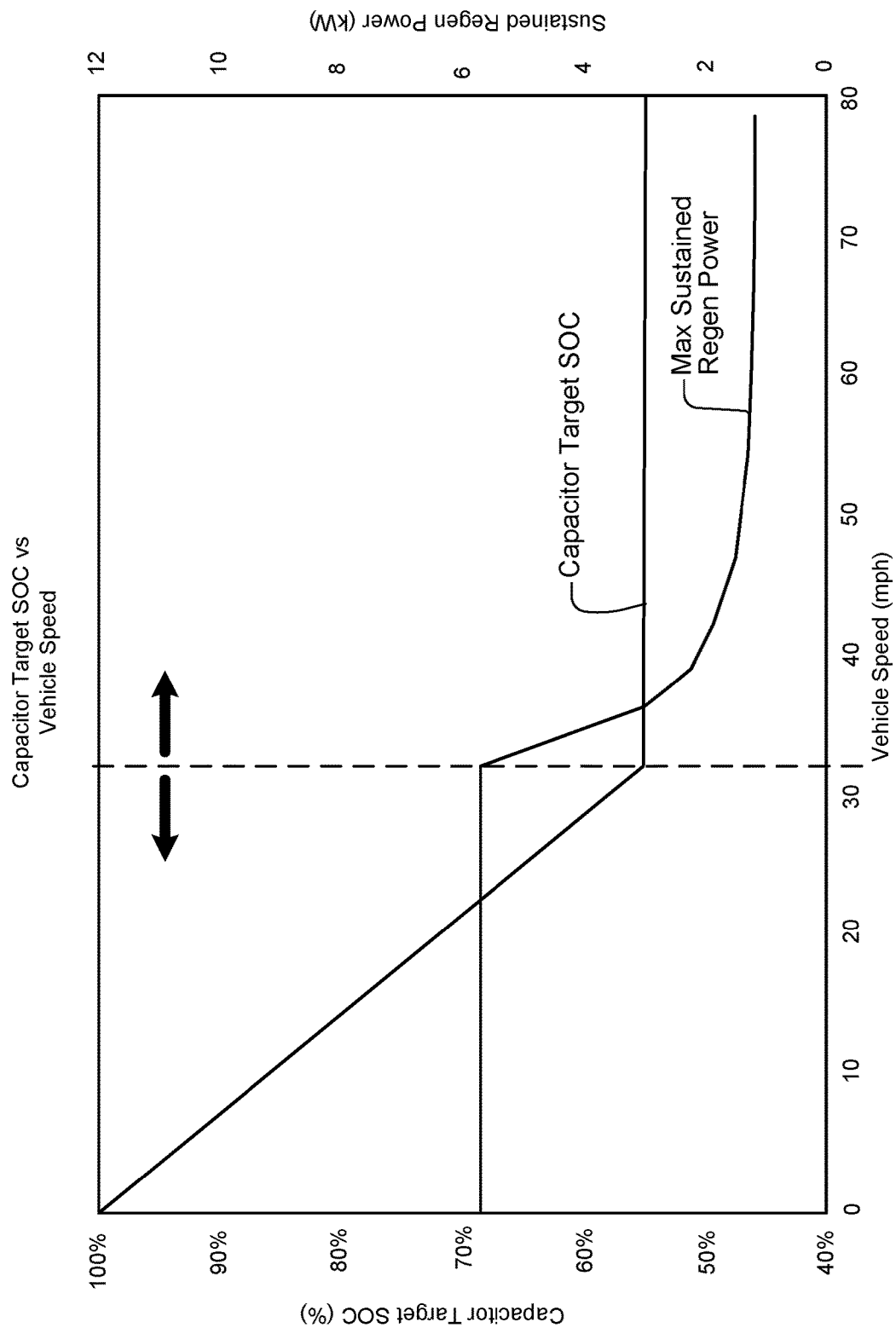

Referring now to FIGS. 7A and 7B, examples of a relationship between capacitor target SOC and vehicle speed is shown. In the example FIG. 7A, a midsize vehicle using 100% regenerative brakes and no friction or foundation braking is shown. In some examples, the slopes of the curves are optimized over time based on real-world vehicle and braking behavior. In other words, the target capacitor SOC and the actual capacitor SOC after the regeneration event are evaluated and adjustments are made to the relationship in FIG. 7A or 7B to improve the results. The target SOC is determined based on the regenerative energy available accounting for the mass of the vehicle, the speed of the vehicle, aerodynamic drag, etc. In some examples, the target capacitor SOC is clipped to account for a minimum system voltage such as about 40V, although other values may be used.

In the example in FIG. 7A, at vehicle speeds below approximately 18 mph, all of the regenerative power that is generated during regenerative braking can be absorbed by the capacitor. At speeds higher than 18 mph, regenerative power that can be absorbed by the capacitor during regenerative braking is reduced since the capacitor does not have the capability of absorbing all of the power generated by the regenerative braking system. For example at 50-70 mph, less than 2 kW of maximum sustained regenerative power can be absorbed during the regenerative braking event. At speeds less than or equal to 18 mph, maximum sustained regenerative power of 11 kW can be absorbed.

In FIG. 7B, the speed at which all of the regenerative power can be absorbed by the capacitor during regenerative braking events increases when the foundation brakes are applied in conjunction with the regenerative braking system. In some examples, the foundation brakes provide 50% of the braking force and the capacitor can absorb all of the regenerative braking power at higher vehicle speeds than in FIG. 7A.

Referring now to FIG. 8A, an example of the protection circuit 160 is shown. The protection circuit 160 is shown to include a disconnect circuit 440 and an optional diode 448. Portions of the power management module 112 are also shown. The power management module 112 may also include a disconnect module 444.

The optional diode 448 may be provided to allow current flow in one direction from the battery to essential vehicle loads 452 but to prevent current flow in the opposite direction. In some examples, the essential vehicle loads 452 include vehicle loads that are associated with the power management module 112, vehicle access and/or starting. For example, all or part of the power management module 112 may be powered. When powering only part of the power management module 112, the battery monitoring module 192 and the disconnect module 444 are powered. Other portions of the power management module 112 may also be powered. In the example in FIG. 8A, the essential vehicle loads are shown to include all or part of a keyless entry system 456 and/or a key FOB detection system 458. In some examples, the power management module 112 is also powered as an essential load.

When the battery protection module 197 of the power management module 112 detects the battery SOC is less than a battery SOC threshold (e.g. after the vehicle has been parked for a while), the battery protection module 197 reduces parasitic loads on the battery 108 by disconnecting nonessential vehicle loads to preserve remaining battery life. To that end, the battery protection module 197 sends a signal to the disconnect module 444, which generates a disconnect signal for the disconnect circuit 440. The disconnect circuit 440 disconnects nonessential vehicle loads 454 and the DC/DC converter system 161. As a result, parasitic current levels are reduced and the battery can last for a longer period of time and support engine restart (by recharging the capacitor).

When it is likely that the engine may be started, the disconnect module 444 reconnects the nonessential vehicle loads 454 and prepares for the engine to start. In some examples, the capacitor SOC is checked and the capacitor is recharged in anticipation of a vehicle restart. For example, the vehicle is likely to be started when the key FOB detection system 458 detects the presence of a key FOB in the vicinity of the vehicle (and/or when a door of the vehicle is opened) and sends a signal to the disconnect module 444.

If the engine of the vehicle is not restarted within a predetermined period after the nonessential loads are reconnected, the battery protection module 197 and the disconnect module 444 disconnect the nonessential vehicle loads 454 to preserve the battery charge.

In some examples, the disconnect circuit 440 includes a bi-stable relay. The bi-stable relay only consumes power when changing states, has low resistance and low heat dissipation requirements. Disadvantages include the inability to allow unidirectional operation (charge only or discharge only). In other examples, the disconnect circuit includes P-channel and N-channel MOSFETs. The MOSFETs allow unidirectional charge/discharge operation via a body diode. Disadvantages include consumption of power when in the closed or operating state, the requirement for heatsink under load and increased printed circuit board (PCB) area.

Referring now to FIG. 8B, the disconnect circuit 440 is shown to include P-channel and N-channel MOSFETs that are connected in series. The disconnect circuit allows unidirectional operation via body diodes of the MOSFETs. To prevent charge and allow discharge, the N-channel MOSFET is opened and the P-channel MOSFET is closed. To prevent discharge and allow charge, the P-channel MOSFET is opened and the N-channel MOSFET is closed. Both the N-channel and P-channel MOSFETs are opened to prevent charge and discharge. Both the N-channel and the P-channel MOSFETs are closed to allow charge and discharge.

Figure 9:
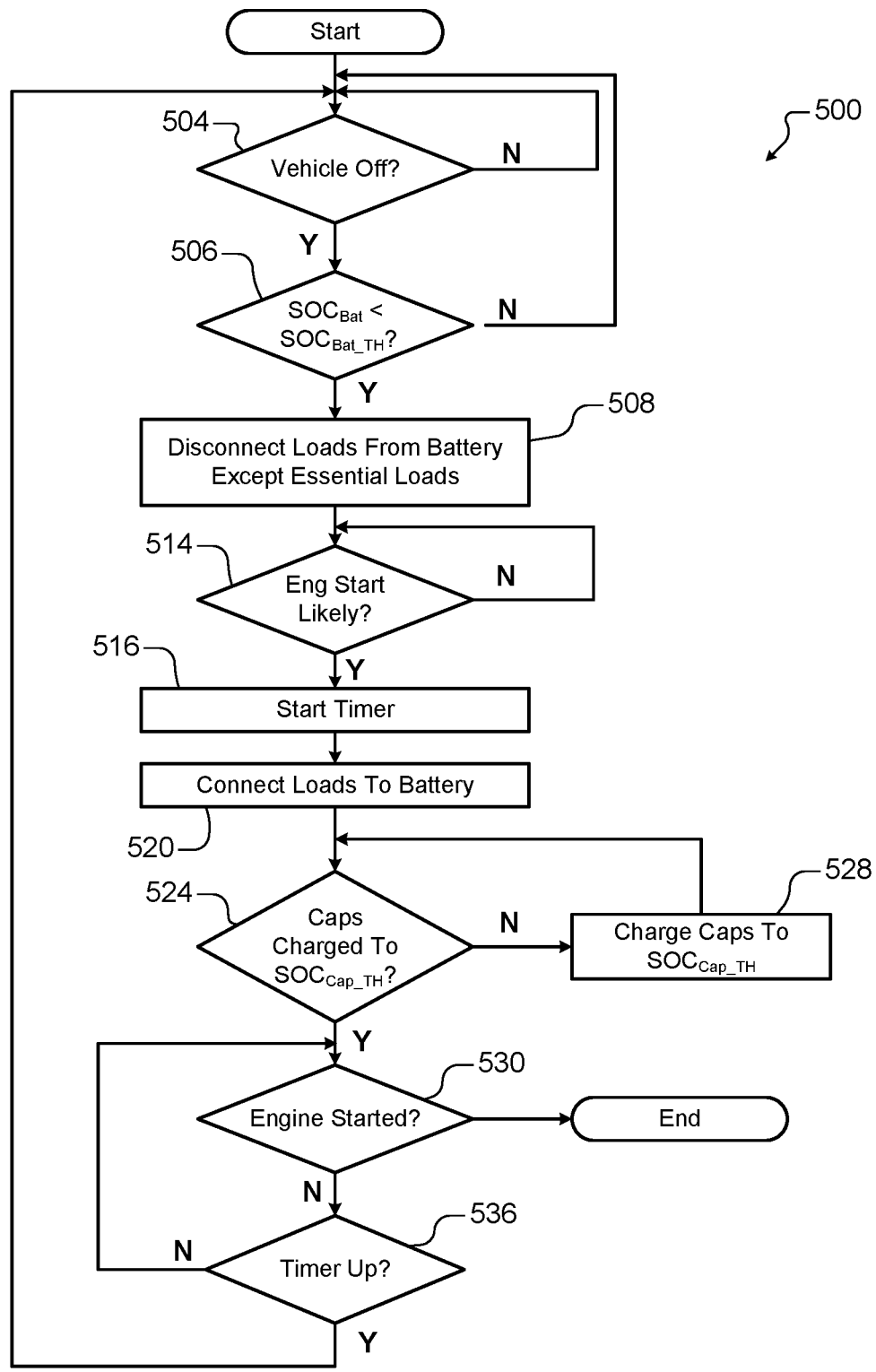
FIG. 9 is a flowchart of an example of a method for disconnecting vehicle loads when the vehicle is parked for longer periods without the engine running.

Referring now to FIG. 9, a method 500 for disconnecting loads when the vehicle is parked for longer periods of time (e.g. 4-31 days) based on battery SOC is shown. At 504, the method determines whether the vehicle is off. When 504 is true, the method continues with 506 and determines whether the battery SOC is less than or equal to a battery SOC threshold. When 506 is true, nonessential loads are disconnected from the battery at 508. Essential loads continue to be supplied by the battery.

At 514, the method determines whether an engine start is likely to occur soon. For example, an engine start may occur when a key FOB is within a vicinity of the vehicle and/or a vehicle door is opened. When an engine start is likely to occur as determined at 514, the method starts a timer at 516 and connects the previously disconnected vehicle loads to the battery at 520. At 524, the method determines whether the capacitor is charged above a capacitor SOC threshold. If 524 is false, the method continues with 528 and charges the capacitor to the capacitor SOC threshold.

At 530, the method determines whether the engine has been started. If the engine is started as determined at 530, the method ends. If the engine is started, the generator may be used to recharge the battery and/or the capacitor.

If 530 is false, the method continues with 536 and determines whether the timer is up. In some examples, the timer is set to a predetermined period in a range for 5 to 20 minutes, although other periods can be used. If 536 is false, the method returns to 530. When 536 is true, the method returns to 504. In other words, if the engine is not started, the loads are disconnected again to continue to preserve battery life.

Figure 10:
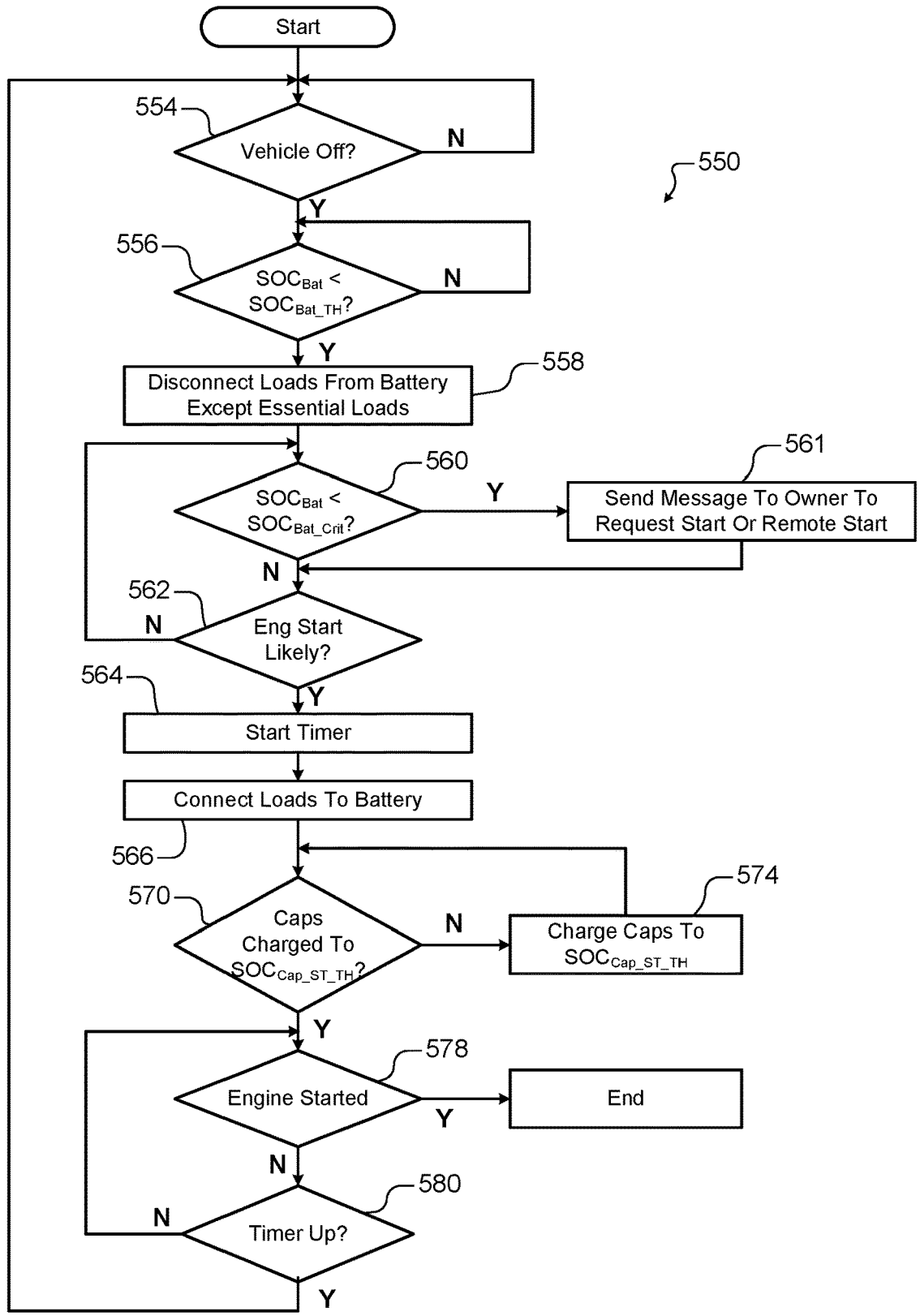
FIG. 10 is a flowchart of another example of a method for disconnecting vehicle loads when the vehicle is parked for longer periods without the engine running.

Referring now to FIG. 10, a method 550 for disconnecting loads when the vehicle is parked for longer periods of time (e.g. 4-31 days) based on battery SOC is shown. When the battery SOC falls below a battery SOC threshold, the vehicle uses the vehicle communication systems 195 to send a text, email, alert and/or notification to a smart phone or other computer associated with the vehicle owner. The text, email, alert and/or notification may instruct the vehicle owner that the battery needs to be charged and/or a request that the vehicle owner initiate a remote engine restart. The text, email, alert and/or notification may also ask the vehicle owner to confirm that the vehicle is outside or in a ventilated area to allow the engine to run safely. Once confirmation is received by the vehicle, the power management module 112 causes the engine to start and uses the generator to recharge the battery to a predetermined battery SOC. In some examples, the predetermined battery SOC is in a range from 25% to 100%.

At 554, the method determines whether the vehicle is off. When 554 is true, the method continues with 556 and determines whether the battery SOC is less than or equal to a battery SOC threshold. When 556 is true, nonessential loads are disconnected from the battery at 558. Essential loads continue to be supplied by power from the battery.

At 560, the method determines whether the SOC of the battery is less than a critical battery SOC threshold. For example, the critical battery SOC may be 15%, 10%, 5% or another value. If 560 is true, the method continues with 561 and sends a message to the vehicle owner to request start or remote start as described above.

Control continues from 560 (if false) or 561 with 562. At 562, the method determines whether an engine start will likely occur soon. For example, an engine start may occur when a key FOB is within a vicinity of the vehicle and/or a vehicle door is opened. When an engine start is likely to occur as determined at 562, the method starts a timer at 564 and connects the previously disconnected vehicle loads to the battery at 566. At 570, the method determines whether the capacitor is charged above a capacitor starting SOC threshold. If 570 is false, the method continues with 574 and charges the capacitor to the capacitor starting SOC threshold.

At 578, the method determines whether the engine has been started. If the engine is started as determined at 578, the method ends. If the engine is started, the generator may be used to recharge the battery and the capacitor.

If 578 is false, the method continues with 580 and determines whether the timer is up. In some examples, the timer is set to a predetermined period in a range for 5 to 20 minutes. If 580 false, the method returns to 554. When 578 is true, the method returns to 508. In other words, if the engine is not started, the loads are disconnected to continue to preserve battery life.

Figure 11:
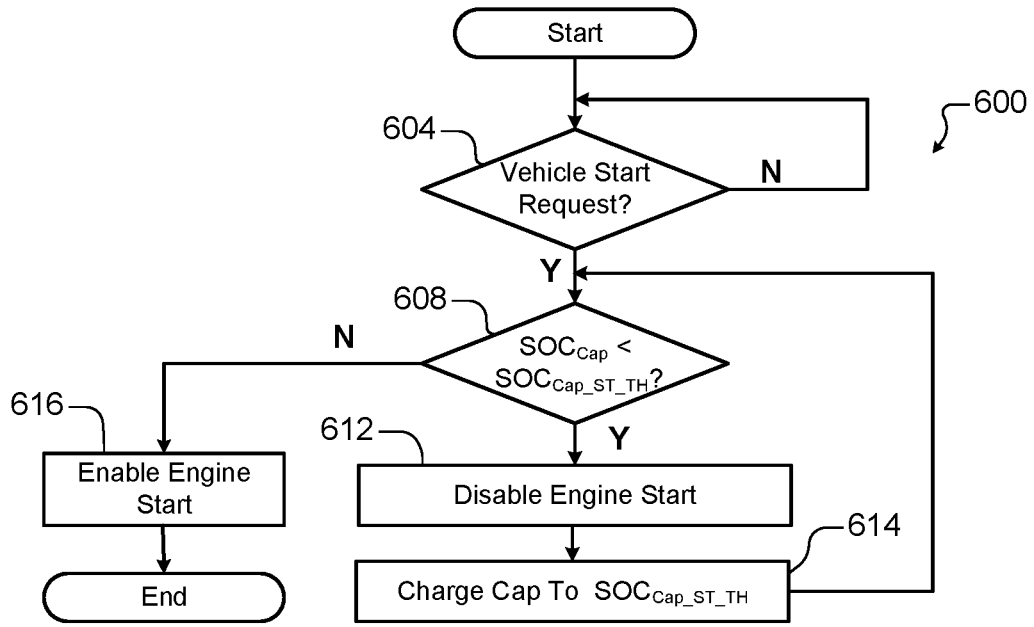
FIG. 11 is a flowchart of an example of a method for charging the capacitor in response to a vehicle start request.

Referring now to FIG. 11, there are some situations when the capacitor does not have a sufficient SOC to start the engine. For example, the capacitor SOC tends to fall over time due to parasitic loads when the capacitor is not charged. For example, the capacitor SOC may eventually fall below an acceptable capacitor SOC when the vehicle sits idle without the engine starting.

A method 600 for charging the capacitor in response to a vehicle start request is shown. At 604, the method determines whether a vehicle start request has occurred. When 604 is true, the method continues with 608 and determines whether the capacitor SOC is less than a capacitor SOC target. When 608 is true, an engine start is disabled at 612. At 614, the capacitor is charged to the capacitor SOC target. If 608 is false, the engine start is enabled at 616.

Figure 12:
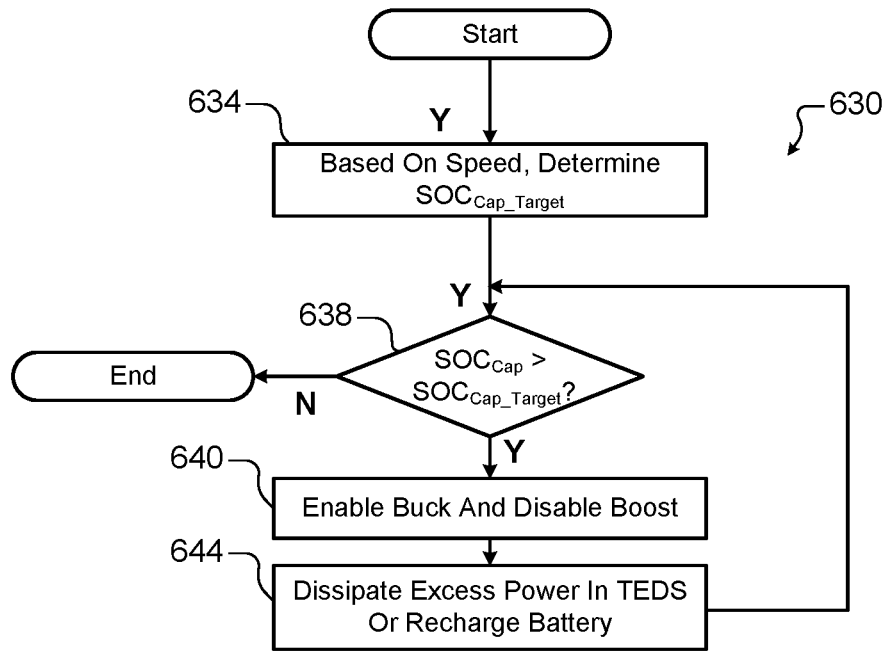
FIG. 12 is a flowchart of an example of a method for discharging the capacitor by charging the battery or supplying power to the TEDs based on vehicle speed.

Referring now to FIG. 12, a method 630 for discharging the capacitor into the battery or TEDs based on vehicle speed is shown. When the vehicle speed is high, there is a high likelihood that a regeneration event will occur soon. Therefore, the capacitor is discharged in advance to provide storage in the capacitor for power generated by the regenerative braking event. The power can be used to charge the battery or to power other vehicle loads such as the TEDs to improve efficiency and extend battery and capacitor life.

At 634, the method generates a target capacitor SOC based on vehicle speed and/or a function of vehicle speed. At 638, the method determines whether the capacitor SOC is greater than the target capacitor SOC. If 638 is true, the method enables the buck converter and disables the boost converter at 640 and dissipates excess power in vehicle loads such as the TEDS or uses power in the capacitor to recharge the battery at 644. The method continues from 644 with 638. When the capacitor SOC is less or equal to the target capacitor SOC, the method returns.

Figure 13:
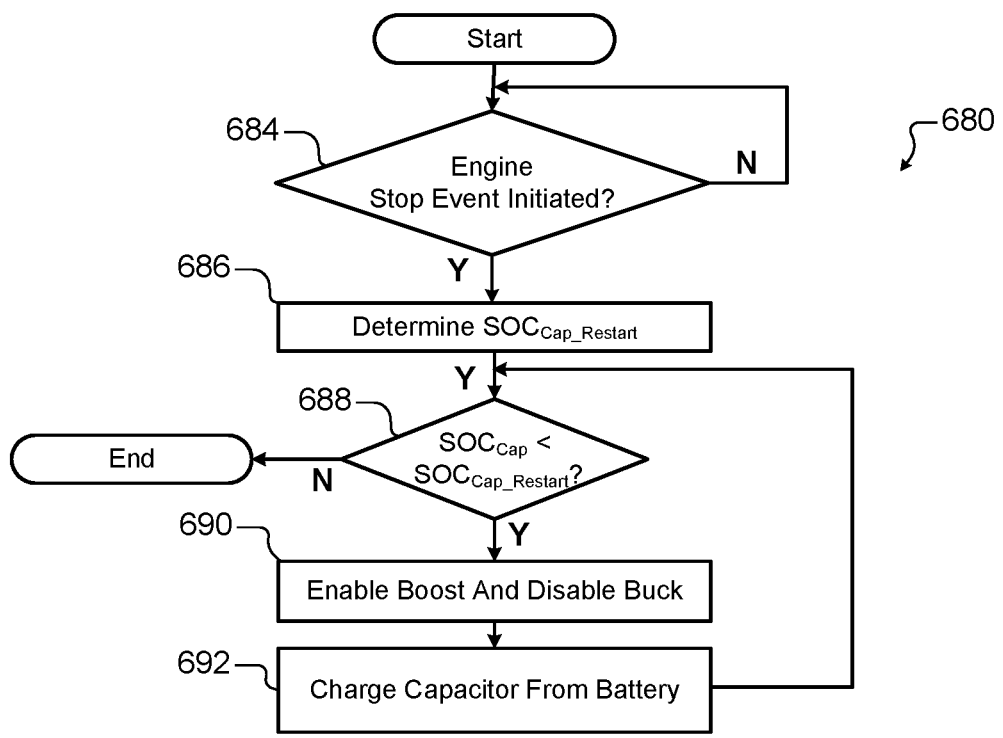
FIGS. 13 and 14 are flowcharts of examples of methods for charging the capacitor in response to an engine stop during an engine stop/restart event.
Figure 14:
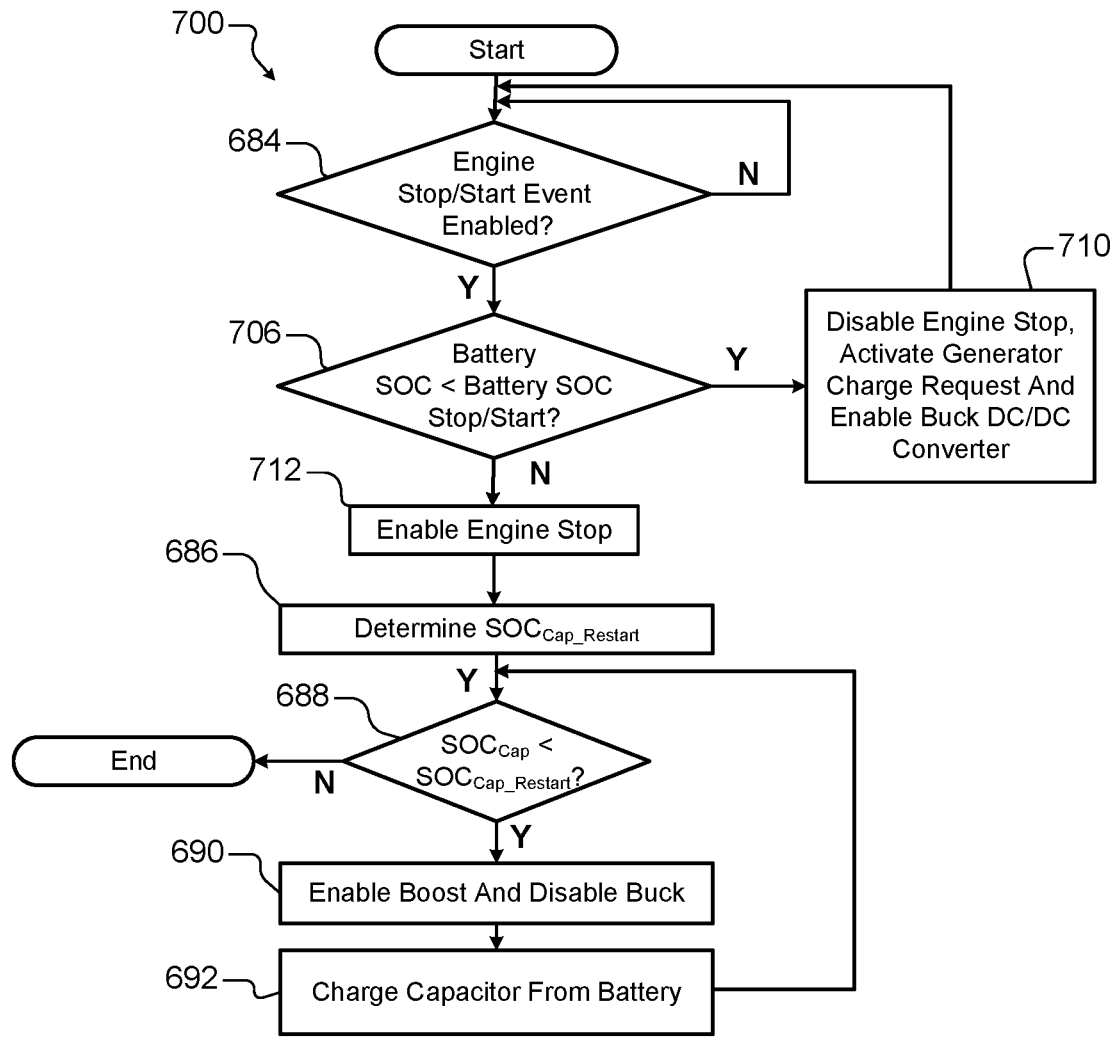

Referring now to FIGS. 13 and 14, a method 680 for charging the capacitor in response to an engine stop during an engine stop/restart event is shown. In FIG. 13, when an engine stop occurs during an engine stop/restart event, the capacitor may not have a sufficient SOC to restart the engine. In some examples, the capacitor is charged by the battery after the engine stop while the engine is off.

In other examples in FIG. 14, after an engine stop/start event is enabled, the engine stop is disabled until the capacitor is recharged. In some examples, the engine stop is disabled until the capacitor is recharged when the battery SOC is less than or equal to a battery SOC stop/start threshold. In some examples, the battery SOC stop/start threshold is equal to 20%, 30%, 40% or another value. The engine stop is enabled and the capacitor is charged while the engine is off if the battery SOC is greater than or equal to the battery SOC stop/start threshold.

At 684 in FIG. 13, the method determines whether an engine stop event of an engine stop/restart event has been initiated. If 684 is true, the method determines the capacitor SOC restart threshold at 686. At 688, the method determines whether the capacitor SOC is less than the capacitor SOC restart threshold. If 688 is true, the method enables the boost converter and disables the buck converter at 690. At 692, the capacitor is charged by the battery to prepare for a subsequent restart event of the engine stop/restart event. The method continues from 692 with 688. When 688 is false, the method returns.

In FIG. 14, a method 700 further includes determining whether or not the battery SOC is less than the battery stop/start SOC threshold at 706. If 706 is true, the engine stop is disabled, the generator is activated and the battery and capacitor are charged by enabling the buck DC/DC converter while the engine is running and the method continues with 684. If 706 is false, the engine stop is enabled at 712 and the method continues with 686.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any one embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for discharging or charging a capacitor of a hybrid vehicle, the system comprising:
   a target state of charge (SOC) module configured to determine a target state of charge of the capacitor based on a speed of the vehicle; and
   a capacitor charge/discharge module configured to:
      determine whether a state of charge of the capacitor is greater than the target state of charge; and
      dissipate power from the capacitor to at least one of a battery of the vehicle and an electrical load of the vehicle when the state of charge of the capacitor is greater than the target state of charge.

2. The system of claim 1 further comprising a power management module configured to:
   supply a first amount of power from the battery to at least one of a starter of the vehicle and a generator of the vehicle during cranking of an engine of the vehicle; and
   supply a second amount of power from the capacitor to the at least one of the starter and the generator during cranking of the engine, wherein the second amount of power is greater than the first amount of power.

3. The system of claim 2 wherein the target SOC module is configured to selectively determine the target state of charge based on an inverse relationship between the vehicle speed and the target state of charge.

4. The system of claim 3 wherein:
   when the vehicle speed is less than or equal to a predetermined speed, the target SOC module is configured to determine the target state of charge based on the inverse relationship between the vehicle speed and the target state of charge; and
   when the vehicle speed is greater than the predetermined speed, the target SOC module is configured to set the target state of charge to a predetermined value.

5. The system of claim 1 wherein the electrical load includes a thermal electric device.

6. The system of claim 1 wherein the target SOC module is configured to determine the target state of charge further based on a ratio of an amount of friction braking used in the vehicle relative to an amount of regenerative braking used in the vehicle.

7. The system of claim 1 further comprising a DC/DC boost converter and a DC/DC buck converter that are connected between the battery, the capacitor, and at least one of a starter of the vehicle and a generator of the vehicle, wherein the capacitor charge/discharge module disables the DC/DC boost converter and enables the DC/DC buck converter to discharge the capacitor.

8. The system of claim 1 wherein the capacitor charge/discharge module is configured to:
   determine whether the state of charge of the capacitor is within a predetermined range of the target state of charge; and
   dissipate power from the capacitor to at least one of the battery and the electrical load when the state of charge of the capacitor is greater than the target state of charge and outside of the predetermined range.

9. The system of claim 8 wherein the capacitor charge/discharge module is configured to charge the capacitor using power from at least one of the battery of the vehicle and a generator of the vehicle when the state of charge of the capacitor is less than the target state of charge and outside of the predetermined range.

10. The system of claim 9 further comprising a DC/DC boost converter and a DC/DC buck converter that are connected between the battery, the capacitor, and at least one of a starter of the vehicle and the generator of the vehicle, wherein the capacitor charge/discharge module enables the DC/DC boost converter and disables the DC/DC buck converter to charge the capacitor.

11. A method for discharging or charging a capacitor of a hybrid vehicle, the method comprising:
   determining a target state of charge of the capacitor based on a speed of the vehicle;
   determining whether a state of charge of the capacitor is greater than the target state of charge; and
   dissipating power from the capacitor to at least one of a battery of the vehicle and an electrical load of the vehicle when the state of charge of the capacitor is greater than the target state of charge.

12. The method of claim 11 further comprising:
   supplying a first amount of power from the battery to at least one of a starter of the vehicle and a generator of the vehicle during cranking of an engine of the vehicle; and
   supplying a second amount of power from the capacitor to the at least one of the starter and the generator during cranking of the engine, wherein the second amount of power is greater than the first amount of power.

13. The method of claim 11 further comprising selectively determining the target state of charge based on an inverse relationship between the vehicle speed and the target state of charge.

14. The method of claim 13 further comprising:
   when the vehicle speed is less than or equal to a predetermined speed, determining the target state of charge based on the inverse relationship between the vehicle speed and the target state of charge; and
   when the vehicle speed is greater than the predetermined speed, setting the target state of charge to a predetermined value.

15. The method of claim 11 wherein the electrical load includes a thermal electric device.

16. The method of claim 11 further comprising determining the target state of charge further based on a ratio of an amount of friction braking used in the vehicle relative to an amount of regenerative braking used in the vehicle.

17. The method of claim 11 further comprising:
   determining whether the state of charge of the capacitor is within a predetermined range of the target state of charge; and
   dissipating power from the capacitor to at least one of the battery and the electrical load when the state of charge of the capacitor is greater than the target state of charge and outside of the predetermined range.

18. The method of claim 17 further comprising charging the capacitor using power from at least one of the battery of the vehicle and a generator of the vehicle when the state of charge of the capacitor is less than the target state of charge and outside of the predetermined range.

* * * * *